United States Patent [19]

Uchiyama et al.

[11] Patent Number: 4,669,850
[45] Date of Patent: Jun. 2, 1987

[54] FLASH PHOTOGRAPHIC EXPOSURE CONTROL SYSTEM

[75] Inventors: Takashi Uchiyama; Ryoichi Suzuki, both of Kanagawa; Zenzo Nakamura, Saitama, all of Japan

[73] Assignee: Canon Kabushiki Kaisha, Tokyo, Japan

[21] Appl. No.: 831,109

[22] Filed: Feb. 19, 1986

Related U.S. Application Data

[63] Continuation of Ser. No. 783,257, Oct. 2, 1985, abandoned, which is a continuation of Ser. No. 550,505, Nov. 9, 1983, abandoned, which is a continuation of Ser. No. 505,895, Jun. 21, 1983, abandoned, which is a continuation of Ser. No. 313,173, Oct. 20, 1981, abandoned, which is a continuation of Ser. No. 947,422, Oct. 2, 1978, abandoned.

[30] Foreign Application Priority Data

Oct. 6, 1977 [JP] Japan ................................. 52-120415

[51] Int. Cl.⁴ ........................ G03B 7/085; G03B 7/16; G03B 7/24
[52] U.S. Cl. .................................... 354/416; 354/421; 354/195.11

[58] Field of Search ............ 354/416, 417, 421, 145.1, 354/271.1, 195.11

[56] References Cited

U.S. PATENT DOCUMENTS

| | | | |
|---|---|---|---|
| 4,005,444 | 1/1977 | Uchiyama et al. | 354/416 |
| 4,068,245 | 1/1978 | Ohtaki et al. | 354/416 |
| 4,187,019 | 2/1980 | Uchiyama et al. | 354/416 |

Primary Examiner—Russell E. Adams
Attorney, Agent, or Firm—Toren, McGeady and Goldberg

[57] ABSTRACT

An exposure control system for daylight and flash photography. In the flash mode with computer flash light device, the system accommodates for a variation in the otherwise fixed parameter of diaphragm aperture by taking into account the camera-to-subject distance. In one embodiment of the invention, the diaphragm value and the integrated flash light are varied with distance at equal rates to each other, reaching the maximum possible values simultaneously at a distance twice as long as that when the diaphragm is fixed. In another embodiment, these variables are increased one at a time, reaching the maximum value, after which the other is increased to effect an equivalent result.

19 Claims, 19 Drawing Figures (a)

(b)

(a)

(b)

(a)

(b)

F I G. 7
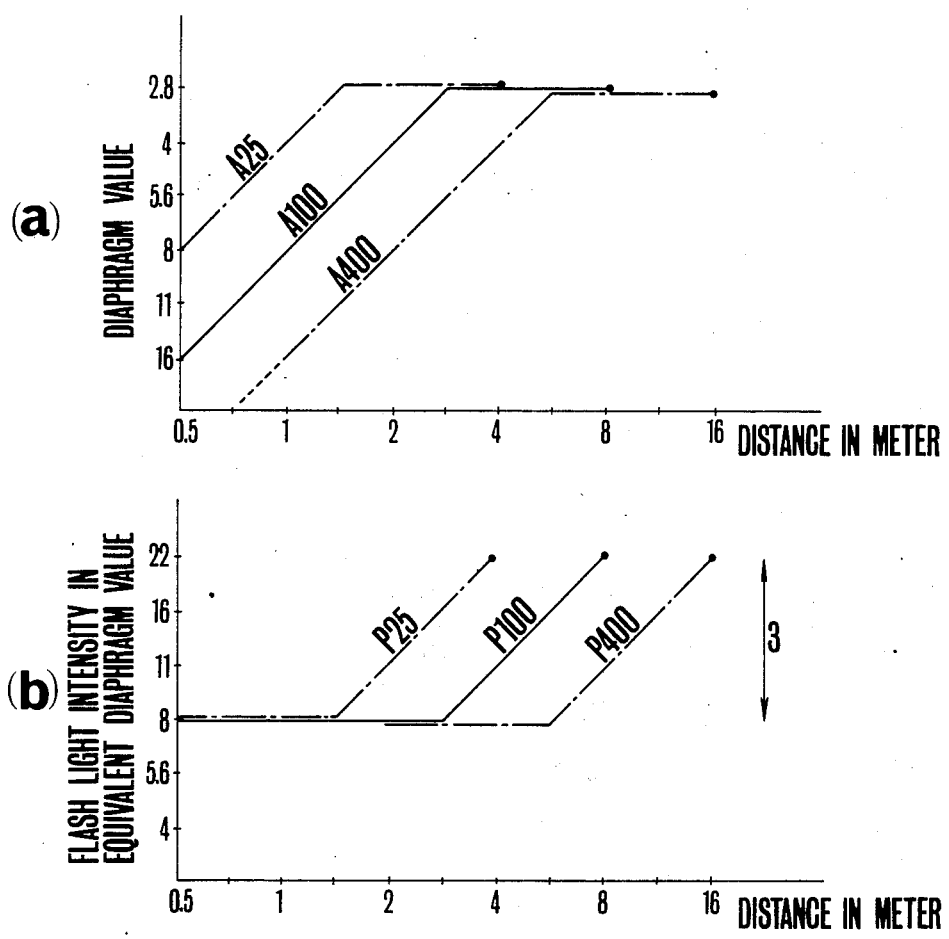

FLASH PHOTOGRAPHIC EXPOSURE CONTROL SYSTEM

This is a continuation of application Ser. No. 783,257, filed Oct. 2, 1985, which was a continuation of application Ser. No. 550,505, filed Nov. 9, 1983, which was a continuation of application Ser. No. 505,895, filed June 21, 1983, which was a continuation of application Ser. No. 313,173, filed Oct. 20, 1981, which was a continuation of application Ser. No. 947,422, filed Oct. 2, 1978, all now abandoned.

BACKGROUND OF THE INVENTION

1. Field of the Invention

The present invention relates to a photographing system with a flash light device particularly a computer flash light device, which enables photography over a greatly expanded range of photographic light situations by controlling the diaphragm value in corespondence to the distance to an object.

2. Description of the Prior Art:

Of the flash photographic exposure control systems there have been two types one of which is so-called "Flash Auto" system. Said "Flash Auto" system regulates the diaphragm aperture valve by factoring the distance value from the camera to a subject into a given guide number. The other type is so-called "Computer Flash Light Device" system in which while the diaphragm aperture is fixed at a given value corresponding to the sensitivity of the used film, the duration of emission of the flash light is adjusted in accordance with the photo-electrically sensed distance to evolve a correct flash exposure value. It follows that the conventional exposure control system in the flash mode have functioned to regulate only one of the two parameters of diaphragm aperture and flash illumination in correspondence with the camera-to-subject distance. While the other parameter is made fixed at a value predetermined independently of the distance. Therefore, when a computer flash light device is used, an accurate exposure can be obtained only within a narrow range of object distance.

For a better understanding of the disadvantages of the prior art flash photography, the following description is made by referring to FIGS. 1A and 1B. In general, exposure values relating to functions of these four variable parameters. Namely, diaphragm aperture Av, camera-to-subject distance Dv, the amount of flash light emitted from flash device Pv and film speed Sv may be determined by applying the following formula in Apex terms to a given photographic situation.

$$Av + Dv = Pv + Sv = Gv \quad (1)$$

wherein Gv is the flash guide number corresponding to the used flash source.

With "Flash Auto" system, this formula becomes:

$$Av = Gv - Dv \quad (2)$$

The required value of diaphragm aperture is taken at a value obtained by dividing the guide number by the camera-to-subject distance since the parameter values are all expressed in logarithmic form. Now assuming that the given guide number is 22 at a film speed of ASA 100, and the range of diaphragm values available in a given camera objective is from 2.8 to 16 inclusive. Then the diaphragm aperture must be adjusted in accordance with the distance as shown by a solid line labeled A100 in FIG. 1A(a) wherein the ordinate represents the diaphragm value in f/step scale if representing F number) and the abscissa represents the distance in square ratio scale of meter. As the film sensitivity changes from ASA 100 to a lower or higher value of ASA 25 or ASA 400 respectively, the distance range over which reliable and accurate exposure values can be derived is shifted toward shorter and longer distances with the upper limits reaching 4 or 16 meters and with the lower limits being set at 0.7 and 2.8 meters respectively as shown by the dot-and-dash lines labelled A25 and A400.

The disadvantages of the "Flash Auto" system are that, since the total amount of flash light emitted for one actuation of the flash unit is always maintained constant and the total amount of flash light is constant irrespective of the distance.

Supposing that the amount of flash light corresponds to a guide number of 22 for a film of ASA 100, and the diaphragm aperture range of the taking range is set from 2.8 to 16, the diaphragm must be controlled to the value as shown by A100 in FIG. 1A(a) when a film of ASA 100 is used, and the photographable distance is limited to a range of 1.4 to 8 meters. Also when a film of lower sensitivity such as ASA 25 or higher sensitivity such as ASA 400, the diaphragm must be controlled as shown by A25 or A400, and the distance is limited to a range of 0.7 to 4 meters and a range of 2.8 to 16 meters respectively.

In case of the conventional flash auto system mentioned above, the amount of flash light is constant so that the range of the photographable distance for a film of a specific sensitivity is limited and narrow due to the adjustable range of the diaphragm, and also in this conventional system the diaphragm is changed just as the changed amount of film sensitivity so that it is not possible to photograph a subject at a short distance with a high-sensitivity film although it is possible to photograph a subject at a long distance.

For enabling the short distance photographing with a high-sensitivity film, a flash device of a small capacity of flash light may be used, but when a low-sensitivity film is used the problem that the long-distance photographing is impossible is not solved.

To eliminate the above-mentioned drawbacks of the "Flash Auto" system, a number of flash units of different light energy may be selectively used. As another example, use may be made of a single flash unit of which the flash light energy is manually changeable. In any case, the utility of the exposure control system is prejudiced to a large extent.

The disadvantages of the "Computer Flash Light Device" system according to the prior art will now be explained in detail by reference to FIG. 1B. When the distance is changed by one graduation, the amount of flash light emitted is changed by one step. In other words, when the distance is increased twice, the amount of flash light emitted is increased twice. With a flash unit having two discrete light levels labelled PH and PL as shown in FIG. 1B(b), when the used film has a speed of ASA 100 and the light adjustment characteristic of the flash unit is set at PH, the required value of diaphragm aperture is f/5.6 independently of the distance as shown in FIG. 1B(a) to effect a correct flash exposure. In this case, therefore, since the maximum amount of flash energy available is 22 at ASA 100, the reliable and accurate exposure control is made possible until 4 meters. When the light adjustment characteristic is changed to PL with the film speed unchanged from ASA 100, the diaphragm value is changed from f/5.6 to f/2.8 to derive a correct exposure value until 8 meters. When ASA 400 is used, the diaphragm value is changed by two steps from the position for ASA 100, and the upper limit of the distance range is 4 or 8 meters at AH400 or AL400 respectively. In other words, when the flash light adjustment characteristic is set at PH and the film of ASA 400 is used, the diaphragm value is required to be AH400 (F11) to effect a correct flash exposure. In this case, the exposure can be made for the subject at a maximum distance of 4 meters. When the adjustment characteristic is set at PL and the film of ASA 400 is used, the diaphragm value is required to be AL400 (F5.6) to effect a correct exposure. In this case, the upper limit of the distance range is 8 meters. With ASA 25, the flash light adjustment characteristic is set at PH and the diaphragm value is set at the fully open position for F2.8, the upper limit of the distance range is 4 meters as shown by AH25. But when set at PL, the diaphragm value must be adjusted to F1.4. Since the maximum possible diaphragm value is 2.8, it is impossible to derive a correct exposure value.

In other words, the computer flash light device varies only the diaphragm value depending upon the sensitivity of the used film. Therefore, when the light adjustment characteristic of PH is selected, the use of ASA 100 film leads to the setting the diaphragm value at 5.6 with the upper limit of the distance range being 4 meters, while the use of ASA 400 film leads to the setting the diaphragm value at 11 with the upper limit of the distance range being 4 meters also. For this reason, in the compute flash light device, even when the film speed is increased, the range of distances suited for correct exposure values can not be extended.

As is evident from the foregoing, the conventional computer flash light device does not make it possible to photograph subjects at increased distance (for example, compare AL100 with AL400). On the other hand, when a slow film is used, because of the limitation of the full open aperture value, it becomes impossible to photograph subjects at the increased distances and also with a shallow depth of field.

The above-mentioned drawbacks of the conventional exposure control systems are due to the limitation of the parameter which is varied with distance to either one of the diaphragm value and the amount of flash light emitted and also to the limitation of the parameter which is varied with film speed to the diaphragm aperture only.

SUMMARY OF THE INVENTION

An object of the present invention is to provide a flash photographic exposure control system which has overcome the above-mentioned conventional drawbacks by controlling the diaphragm aperture in accordance with a predetermined control characteristic based on the subject distance when flash photography is performed with the computer flash light device.

Another object of the present invention is to provide a flash photographic exposure control system having a greatly extended range of exposure control by performing flash photography with use of the computer flash light device and by controlling the diaphragm aperture in accordance with the subject distance.

Another object of the present invention is to provide a flash photographic exposure control system in which, for subjects at long distances, the size of diaphragm aperture is rather increased with increase in flash illumination, while for subjects at short distances the size of diaphragm aperture is rather decreased with decrease in flash illumination, thereby a correct flash exposure value is derived, and in which even when faster and slower films are used, a correct exposure value can be derived over a practically sufficient range of distances.

A further object of the invention is to provide a flash photographic exposure control system adapted for use with a computer flash light device and capable of deriving reliable and accurate exposure values over a range of distances which is extended by controlling the flash light energy in accordance with the subject distance and film speed and by controlling the diaphragm aperture in accordance with the subject distance and film speed.

These and other objects, features and advantages of the present invention will become apparent from the following detailed description taken in conjunction with the accompanying drawings in which:

BRIEF DESCRIPTION OF THE DRAWINGS

FIGS. 2 to 8 are diagrams showing seven examples of programs by which the diaphragm aperture and flash light energy are controlled in accordance with the distance according to the present invention.

DESCRIPTION OF THE PREFERRED EMBODIMENTS

Figure 1A:
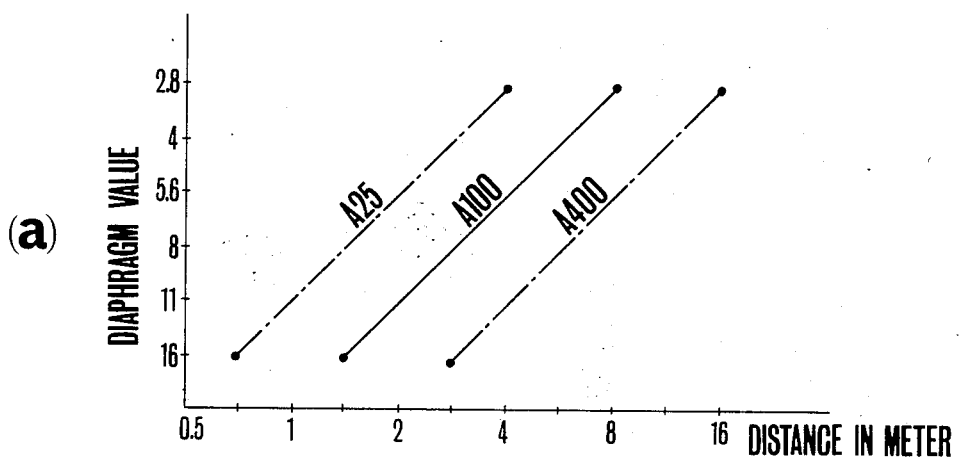
FIGS. 1A and 1B are diagrams showing the manners in which either the diaphragm aperture or the flash light energy is varied with distance according to the prior art.
Figure 1A:
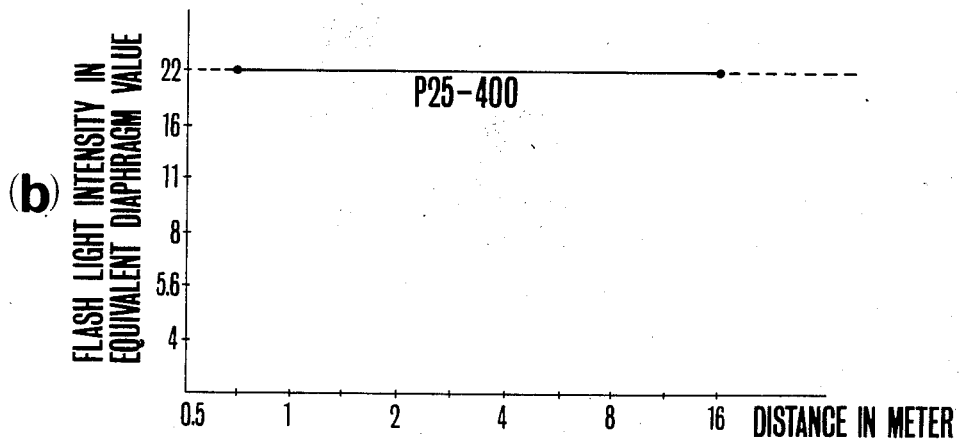
Figure 1B:
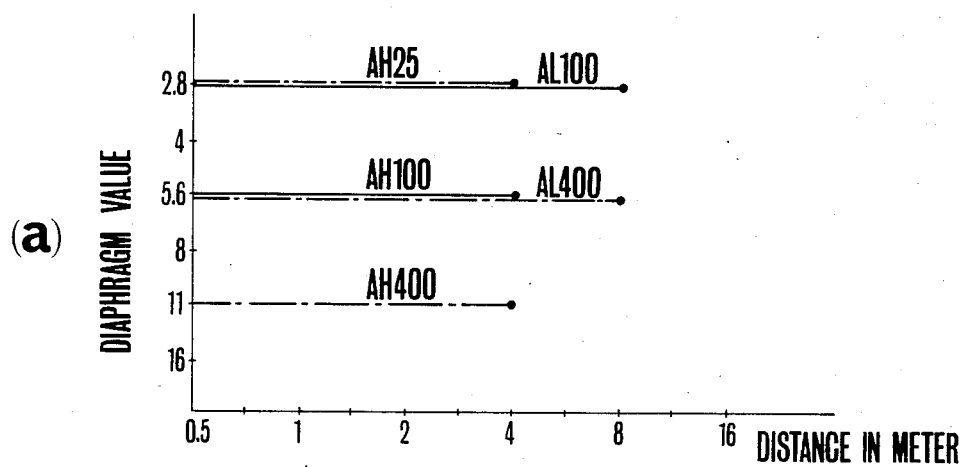
Figure 1B:
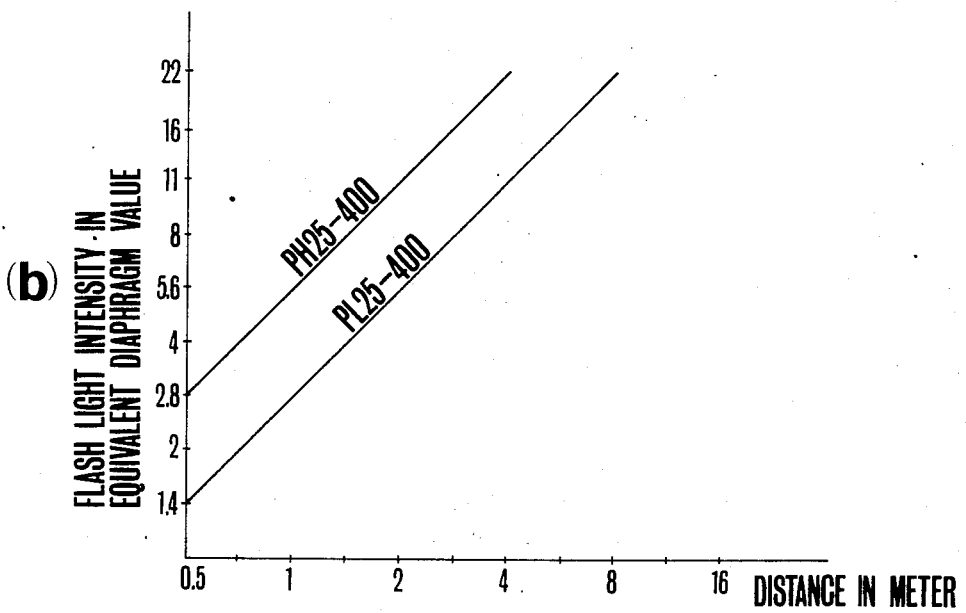
Figure 2:
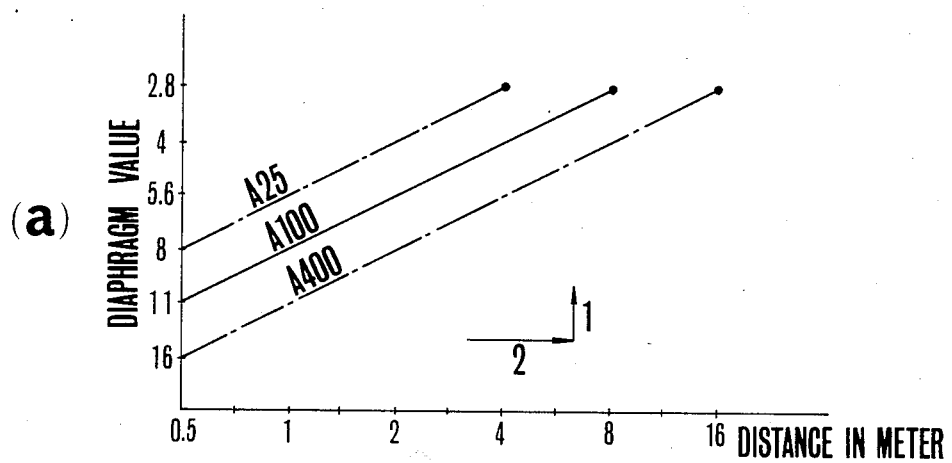
Figure 2:
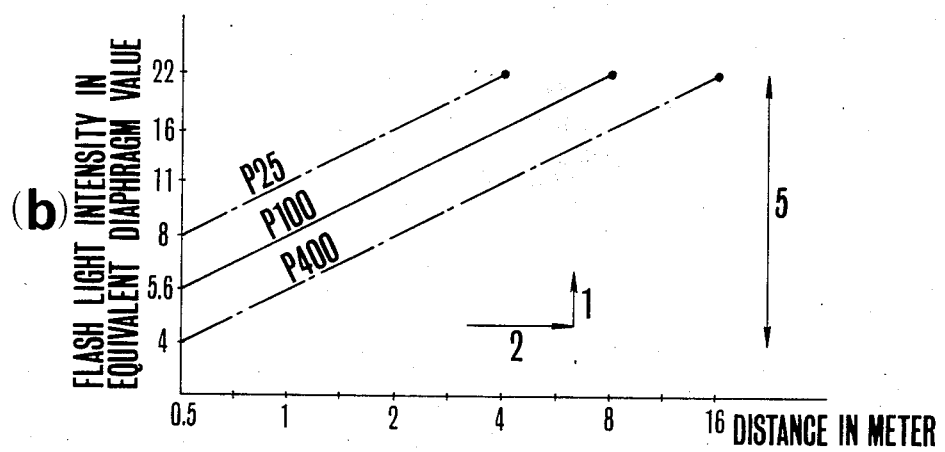

FIG. 2 shows a first example of a program of the invention. For a better understanding of the advantage of the invention over the prior art of FIGS. 1A and 1B, the range of diaphragm values available is assumed to be from F/2.8 to F16 inclusive and the maximum possible total amount of flash light emitted to be 22. In this program, the variations with distance of the diaphragm value and the integrated flash light are controlled simultaneously at equal rates to each other to provide an extended range of distances over which reliable and accurate flash exposure values can be derived. For example, when the used film has a speed of ASA 100, the diaphragm value is varied from F2.8 for a subject at a distance of 8 meters to F11 for a subject distance of 0.5 meter, while the integrated flash light is simultaneously varied from 22 to 5.6, as shown by solid lines labelled A100 and P100 respectively. As the film speed is varied by one graduation, i.e., either four times, or one fourth as large, the diaphragm value and the integrated flash light are simultaneously varied by one step to effect an equivalent result. In comparison with the "Flash Auto" system of FIG. 1A, the distance range is extended toward shorter distances regardless of how much the film speed is. In comparison with the "Computer Flash Light Device" system of FIG. 1B, the upper limit of the distance range is increased with increase in film speed. Another advantage is that the range of variation of the integrated flash light is reduced to only five steps. This feature facilitates the production of electronic timing devices for controlling the duration of emission of the flash light and therefore increases the accuracy of flash exposure control. In addition thereto, a flash exposure control circuit embodying this program, though not shown here but described in greater detail later, can be constructed without unduly large modification of that as employed in the conventional "Flash Auto" system, because the rate of variation with distance of the diaphragm value is slightly different, because the flash duration control can be realized by modifying part of the flash device, and because the film speed setting means can be easily coupled with both of the diaphragm and flash light control means.

Figure 3:
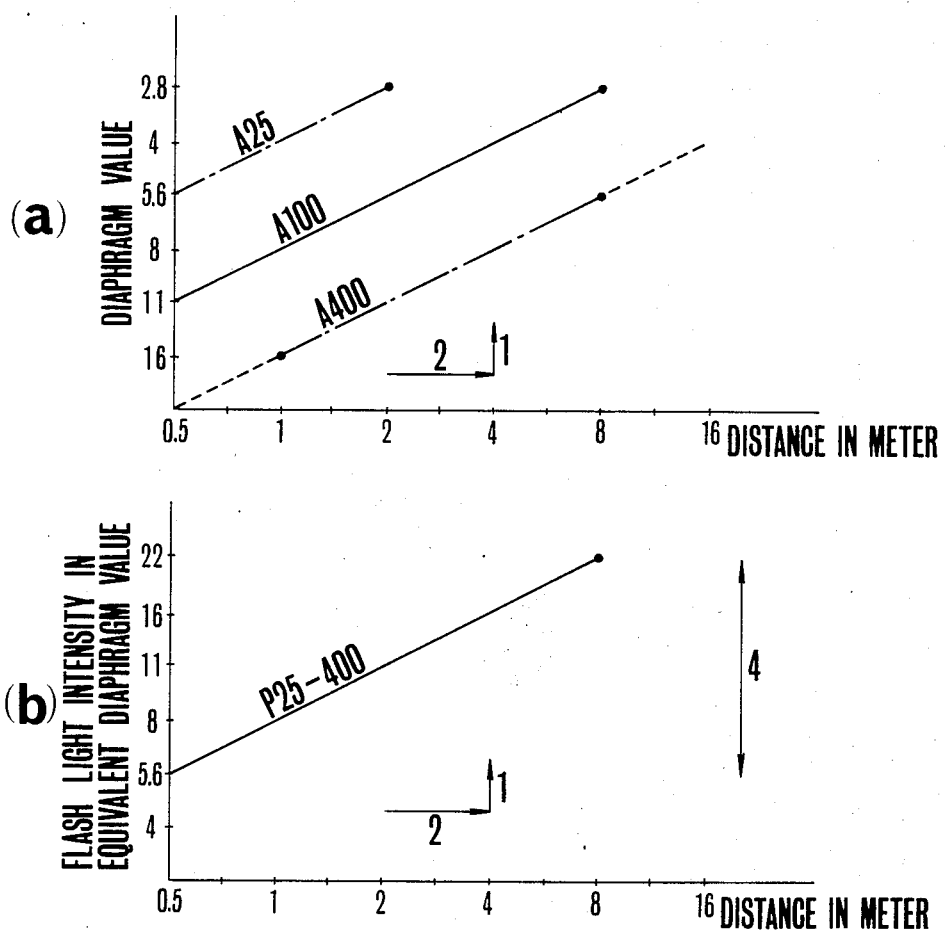

FIG. 3 shows a second program in which the film speed information is not introduced into the flash duration control means but only to the diaphragm control means, while the distance information is introduced into both of these means in the same manner as that shown in FIG. 2. An advantage of this program is that the full range of variation of the integrated flash light is further reduced to four f/steps. The range of distances suited for derivation of correct exposure values is, however, somewhat narrowed as compared with the first program of FIG. 2.

Figure 4:
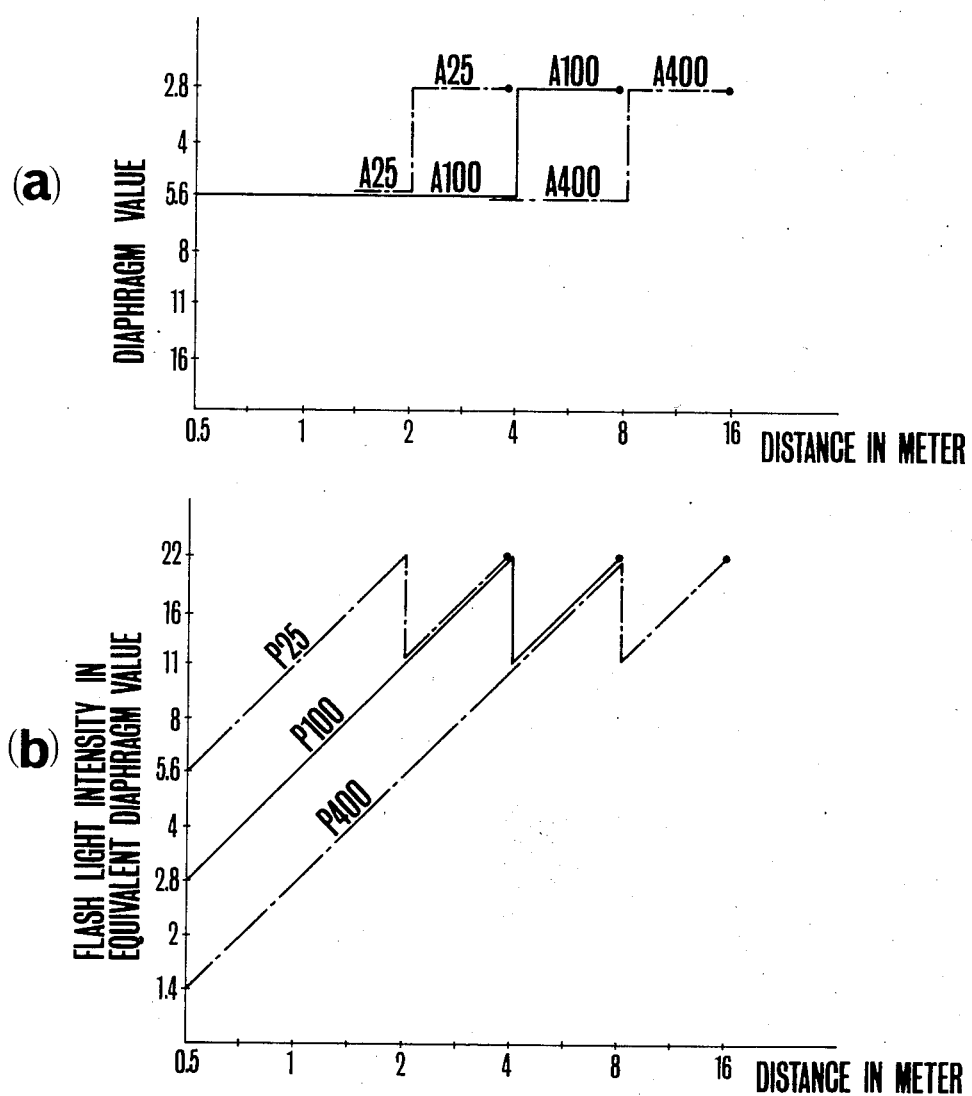

FIG. 4 shows a third program. In FIG. 4, the distance is increased from 0.5 meter, while the diaphragm aperture is first maintained constant at f/5.6. The amount of flash light emitted from flash light device is continuously increased from one of the values corresponding to f/5.6, f/2.8 and f/1.4 steps dependent upon the film speeds ASAs 25, 100 and 400 respectively. The integrated flash light reaches the maximum possible value of f/22 step at a distance of 2, 4 and 8 meters, at which the diaphragm aperture is changed from f/5.6 to the widest open aperture of f/2.8 independently of how much the film speed is. And the flash light level also is dropped to f/11 step. And after which the flash light amount is increased against continuously with increase in distance to provide an extended range of photographic light situations over which reliable and accurate exposure values can be derived. An advantage is that the structure of the necessary diaphragm control means is greatly simplified as compared with the conventional "Flash Auto" system. Another advantage is that the conventional "Computer Flash Light Device" may be made use of with slight modification as by replacing the manually operating light level changeover device by an automatic one of simple construction.

Figure 5:
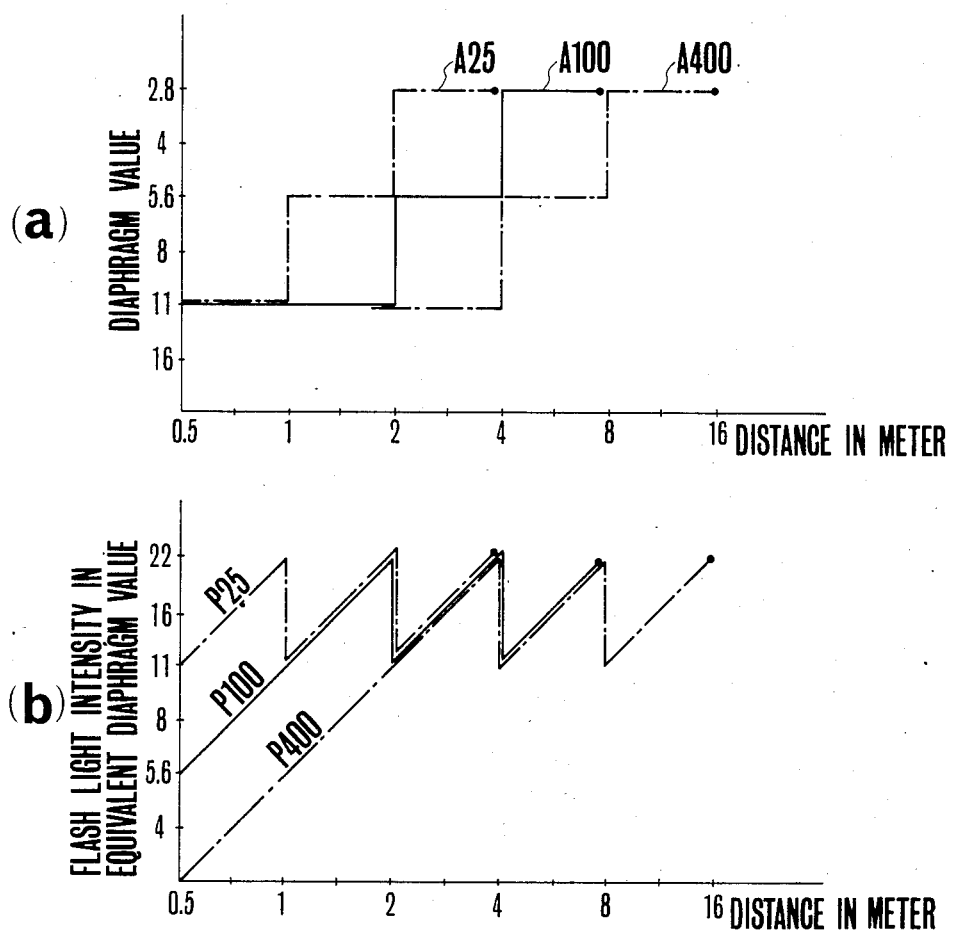

FIG. 5 shows an embodiment in which three kinds of diaphragm values are used in contrast to FIG. 4 in which two kinds of diaphragm values are used.

The specific devices for this embodiment can be prepared in the same manner as for the devices for the embodiment shown in FIG. 4, but as compared with the embodiment shown in FIG. 4, a smaller diaphragm value can be used so that this embodiment has advantages that it is possible to increase the depth of field in a close-up photography and reduce the width of the flash light amount to be controlled by the light amount control means.

Figure 6:
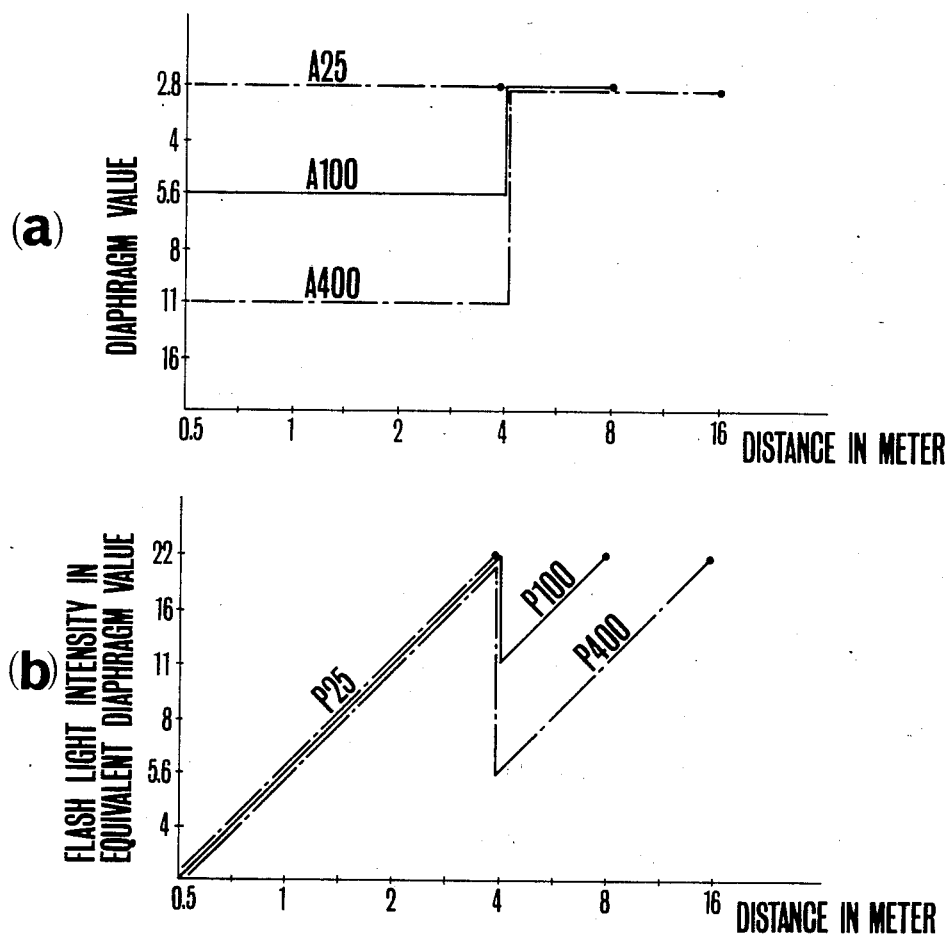

FIG. 6 shows an embodiment in which two kinds of diaphragm values are used for the single film sensitivity just as in FIG. 5, but the diaphragm change-over point is maintained constant irrespective to the film sensitivity. The diaphragm value and the amount of flash light are controlled as easily understood from the drawing. The distance range for a long-distance photography is expanded as wide as possible by using a fully opened diaphragm and a maximum amount of flash light, while the distance range for a close-up photography is expanded more by stopping-down the diaphragm in case of a higher sensitivity film.

FIG. 7 shows a sixth program in which the amount of flash light emitted from the flash device is first maintained constant at f/8 step. The diaphragm aperture is increased with increase in the distance, reaching the maximum value as in the conventional "Flash Auto" system, after which the amount of flash light emitted from the flash device is increased with increase in the distance until the maximum value is reached as in the conventional "Computer Flash Light Device" system. The diaphragm aperture and the amount of flash light emitted from the flash device are varied as function of not only distance but also film speed. Although the range of variation of the flash light is limited to only three f/steps, the range of distances is greatly extended toward longer distances as compared with the conventional "Computer Flash Light Device" system. Another advantage is that, in close-up photography application, the flash light level is lowered sufficiently. Therefore, in the case of a long-distance photography, a proper exposure can be obtained even when the high-sensitivity film is used.

Figure 8:
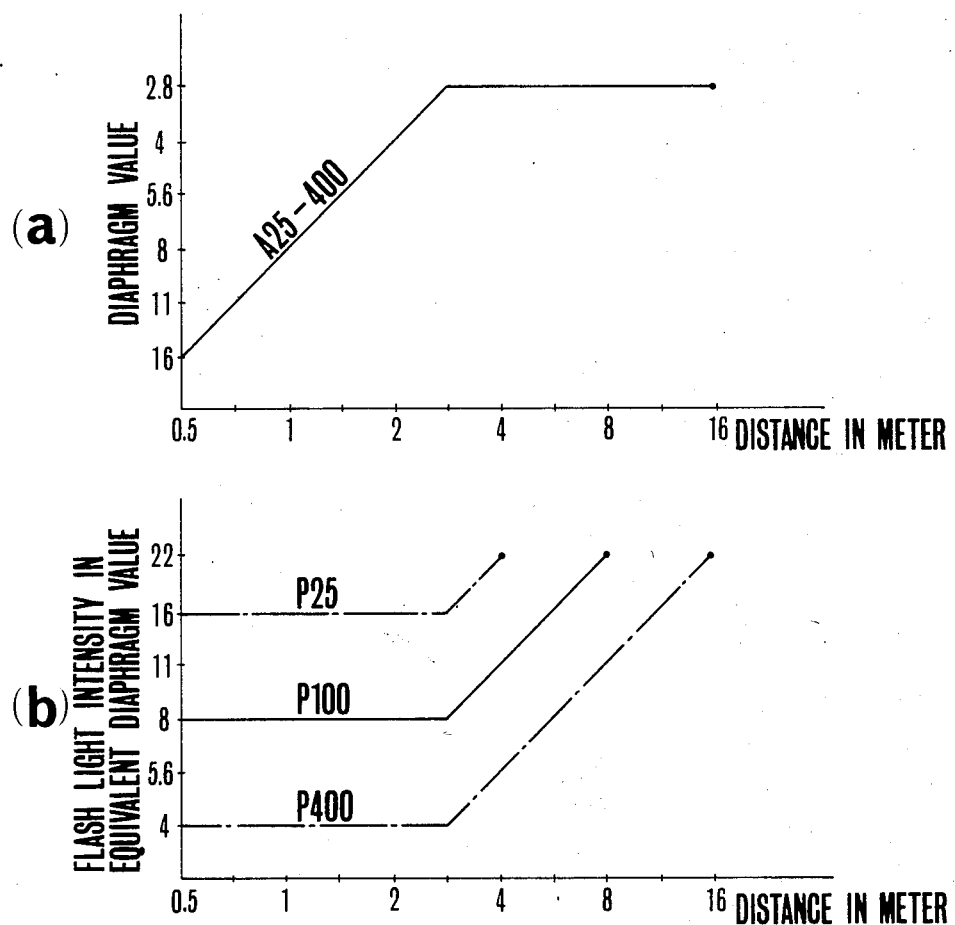

FIG. 8 shows a seventh program adapted to simplify the structure of diaphragm control means as compared with the conventional "Flash Auto" system, while preserving the extended range of photographic light situations by providing a somewhat elaborate structure of flash light control. As shown in FIG. 8(a), the diaphragm aperture is adjusted in accordance with the distance only independently of the film speed. Therefore, the diaphragm control means may be constructed as by removing the film speed setting means from the diaphragm control means adapted for use in the conventional "Flash Auto" system. As shown in FIG. 8(b), for distances longer than 3 meters, the amount of flash light emitted from the flash device is continuously increased as in FIG. 7. While for the shorter distances the amount of flash light emitted from the flash device is maintained constant at a value dependent upon the film speed. By this program, reliable and accurate flash exposure values can be derived over an extended range of distances for any value of film speed likewise as in the above mentioned various programs.

A wide variety of practical embodiments incorporating the unique flash photographic exposure control systems of the present invention for the programs of FIGS. 2 to 8 as associated with automatic daylight exposure control apparatus can be realized by providing design features and production techniques similar to those known in the art as employed in the conventional exposure control apparatus for "Flash Auto" and "Computer Flash Light Device" photography. In the following, the present invention will be described with respect to schematic examples of exposure control circuits for daylight and flash photography thereof.

Figure 9A:
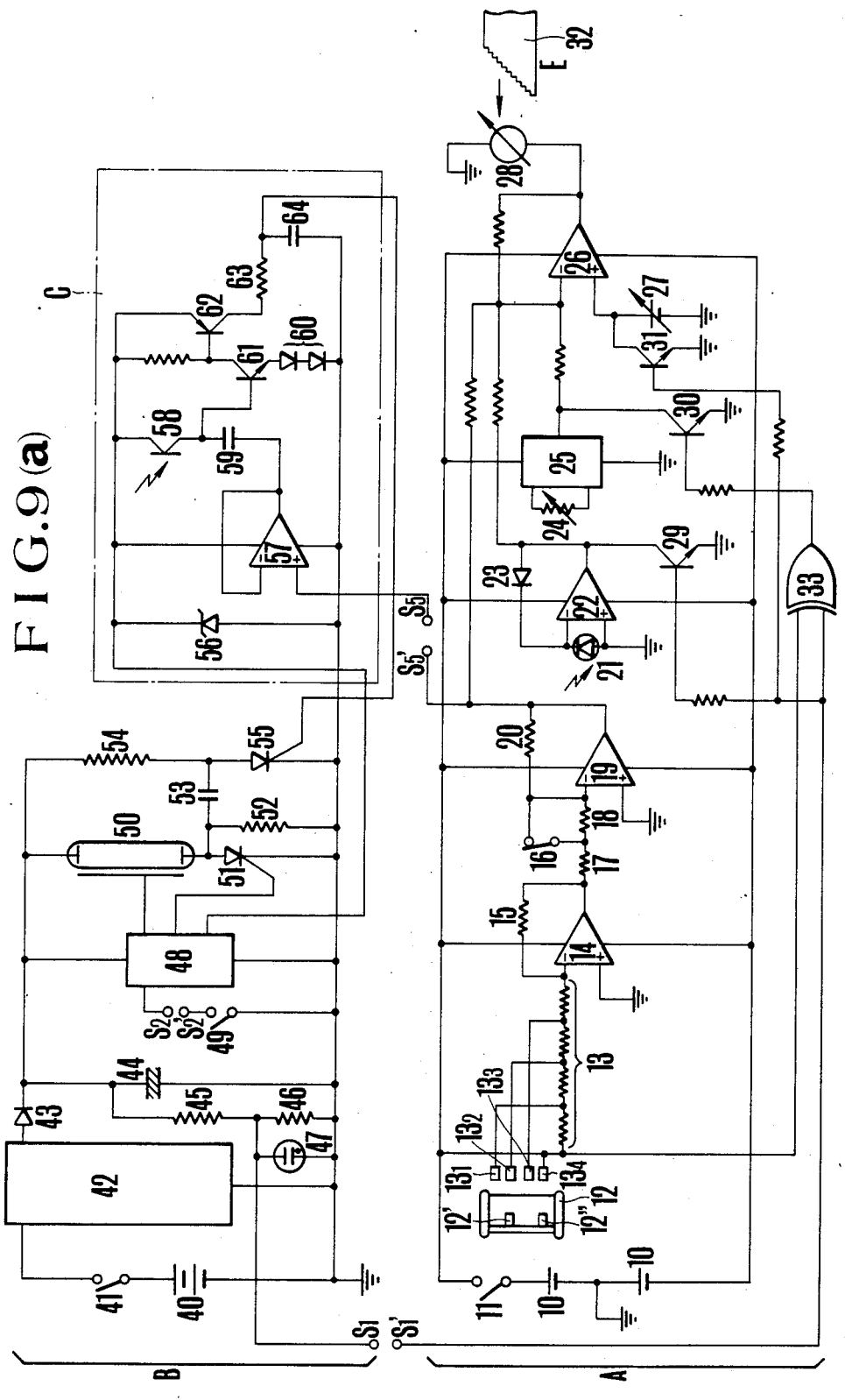
FIG. 9(a) is a schematic electrical circuit diagram of one embodiment of an exposure control system for daylight and flash photography according to the invention adapted to perform the program of FIG. 2.
Figure 9B:
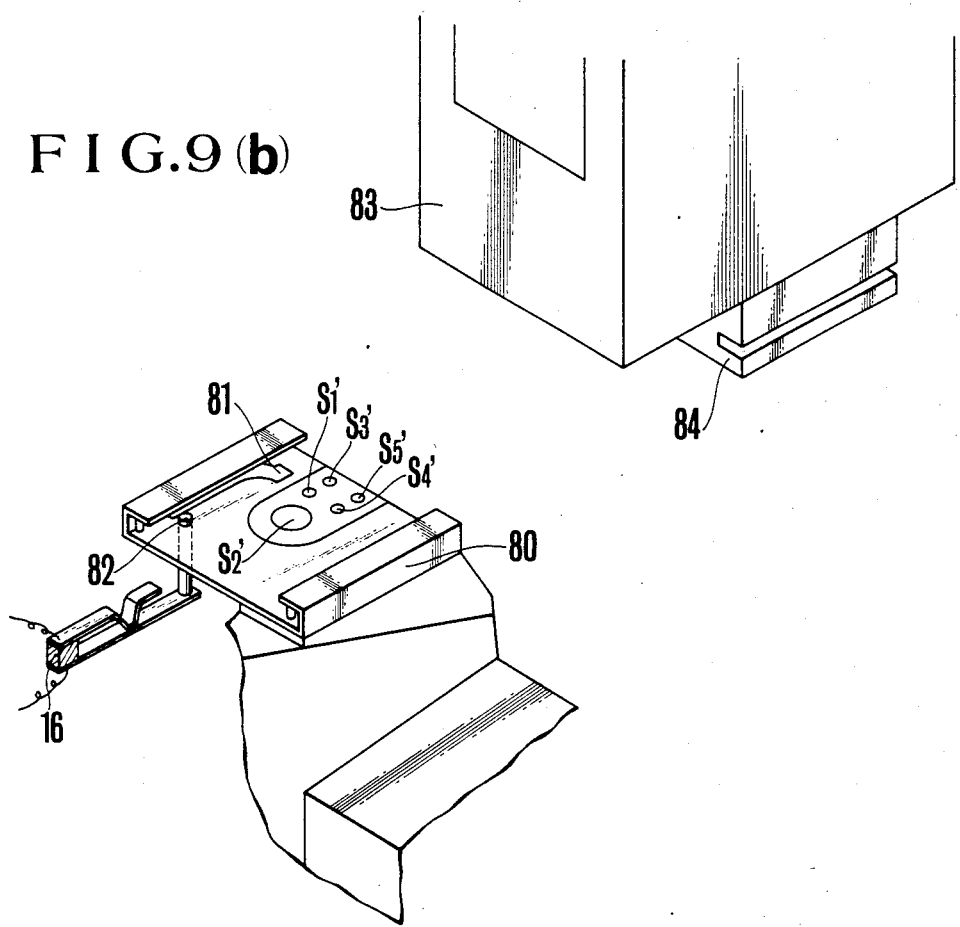
FIG. 9(b) is a fragmentary perspective view of a camera body and a flash unit and of an example of arrangement of a mode selection switch of FIG. 9(a).
Figure 9C:
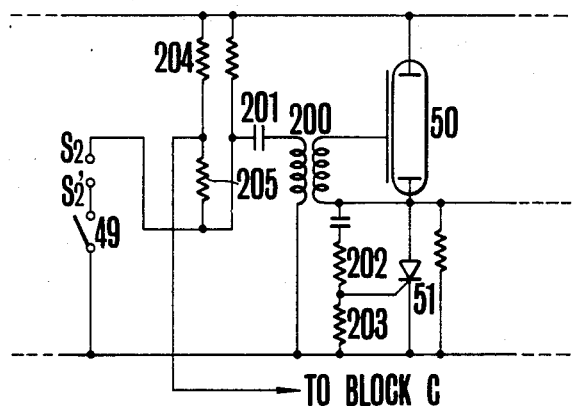
FIG. 9(c) is a diagram showing the details of the trigger circuit of FIG. 9(a).

Referring to FIGS. 9(a) to 9(c), there is shown one embodiment of the exposure control circuit according to the present invention adapted to perform the first program of FIG. 2. The circuit is shown comprising two parts A and B separately incorporated in a camera and a flash unit removably mounted on the camera housing respectively. In the daylight mode, circuit A operates with electrical power supplied from a battery 10 through a main switch 11. The circuit A automatically adjusts the diaphragm aperture of the camera, not shown, in accordance with the preselected shutter speed, scene brightness level and the film speed. The latter is introduced automatically when a film cartridge 12 is inserted into and properly seated in a chamber therefor.

An automatic film speed setting circuit comprises a string of four fixed resistors 13, four marker sensing contact elements 13-1 to 13-4 arranged upon seating the cartridge 12 in the chamber to effect selective electrical contact with two markers 12' and 12" on the cartridge housing. The relative position of the markers 12' and 12" depends upon the film speed value. An inverting amplifier device has an operational amplifier 14 and a feedback resistor 15 connected between an inversion input and an output of the amplifier 14.

An exposure mode responsive amplification degree control circuit comprises first and second fixed resistors 17 and 18 of the same resistance value. The resistors 17 and 18 constitute an inverting amplifier device together with an operational amplifier 19 and a third resistor 20. A mechanical switch 16 is connected across the resistor 18 and arranged to be opened when the flash unit B is attached to the camera A in a manner shown in FIG. 9(b).

A sensor circuit comprises a silicon photo-cell 21 positioned to receive light from a scene to be photographed, an operational amplifier 22, and a logarithmic compression diode 23 connected in the feedback network of the operational amplifier 22.

The voltages at the outputs of the operational amplifiers 19 and 22 are combined in an adder circuit which includes an operational amplifier 26 with a feedback resistor. The operational amplifier has an inversion input connected to not only the outputs of the operational amplifiers 19 and 22 but also an output of a distance responsive variable voltage source 25 through respective balancing resistors, and has a non-inversion input connected to a shutter speed responsive variable voltage source 27. A variable resistor 24 has a resistance value related to a distance from the camera to a subject to be photographed. The resistor 24 is associated with a distance ring (not shown) to determine its resistance value. The output of the adder 26 is applied to an exposure meter 28 having a pointer deflected to a position dependent upon a computed exposure value. The position of the pointer is scanned by a scanning member 32 with steps thereon being impelled against the pointer, whereby the daylight or flash exposure diaphragm aperture is automatically formed through a diaphragm mechanism, not shown.

To switch the camera from the daylight to the flash mode in automatic response to the attainment of the voltage of a storage capacitor 44 in unit B to a predetermined level, there are provided three switching transistors 29, 30 and 31 with their collectors connected to the outputs of the sensor circuit 22, distance setting circuit 25 and shutter speed setting circuit 27 respectively, and with their emitters connected to circuit ground. The bases of the transistors 29 and 31 are connected by way of a common lead to an interconnection terminal S1' on the camera body and therefrom to an interconnection terminal S1 on the flash unit housing connected to a neon tube 47. The base of the transistor 30 is connected to an output of an exclusive OR gate 33 having two inputs, one of which is connected to the common lead of the transistors 29 and 31 and the other of which is connected to a positive bus of the circuit A.

A computer flash light device B includes an electrical power source or battery 40, a main switch 41, a voltage booster 42, a half-wave rectifier diode 43, the storage capacitor 44 connected through the diode 43 to the voltage booster 42, a voltage divider of resistors 45 and 46 connected in series to each other across the storage capacitor 44, and a neon tube 47 connected across the resistor 46. A gas discharge tube 50 connects across the storage capacitor 44 so that the voltage stored on the capacitor 44 appears across the tube 50 when a thyristor 51 in a discharge circuit of the tube 50 is rendered conducting by a trigger circuit 48 of which the details are shown in FIG. 9(c). Connected across tthe thyristor 51 is a commutation capacitor 53 which is charged from the booster 42 through resistors 54 and 52, and a second thryristor 55 is connected in series to the commutation capacitor 53. The said second thyristor 55 has a gating control input connected to an output of an electronic timing device C which is also incorporated in the flash unit.

In FIG. 9(c), the trigger circuit 48 includes a transformer 200. The primary of the transformer coil 200 connected at one end through a capacitor 201 and a resistor to the output of the half-wave rectifier 43, and at the other end thereof to the negative terminal of the battery 40. The junction of the capacitor 201 and the resistor is connected to an interconnection terminal S2 on the flash unit housing and therefrom to an interconnection terminal S2' on the camera housing which is connected to a X sync contactor 49 in a camera shutter. A series circuit of resistors 204 and 205 is connected between the diode 43 and the terminal S2 and has a junction connected to a positive bus of the flash duration control circuit C. The secondary of the transformer 200 connects to a coil surrounding the tube 50. The gating control input of the thyristor 51 is connected to a junction of resistors 202 and 203 between the secondary coil and the negative terminal of the battery 40.

Turning to FIG. 9(a), the circuit C includes a Zener diode 56, an operational amplifier 57 constituting a voltage follower, a photo-transistor 58 positioned to receive light reflected from a subject being photographed with flash illumination. Said photo-transistor 58 is constitutes an integrator circuit together with a capacitor 59. The opposite pole of the capacitor 59 is connected to the output of the operational amplifier 57, and a switching circuit including a transistor 61 with a base connected to the junction of the photo-transistor 58 and the capacitor 59 and with an emitter connected through a string of diodes 60 to the negative bus. The collector of the transistor 61 is connected to the base of a second transistor 62 with an emitter connected to the positive bus and with a collector connected through a resistor 63 and a capacitor 64 in series with the negative bus. The junction of the resistor 63 and the capacitor 64 is connected to the gating control input of the thyristor 55.

With the foregoing description of the circuits in mind, their operation in the flash mode will now be fully described. The operator will first throw the main switch 11 of the camera A and then the main switch 41 of the flash unit B to connect the battery 40 with the booster 42. At the output of the booster 42 there appears a high voltage of alternating current which after having been rectified by the diode 43 is applied to the storage capacitor 44. When the voltage stored on the capacitor 44 has reached a threshold level that assures the firing of the discharge tube 50, the neon tube 47 is lit, informing the operator of the fact that a reliable and accurate flash exposure value for a subject distance shorter than 16 meters at ASA 400 is ready. At the same time the operator actuates the flash mode selecting action so that the two inputs of the exclusive OR gate 33 attain high level simultaneously. This changes the output of gate 33 from the high level to the low level, at which time the transistor 30 is rendered non-conducting to bring the distance responsive voltage source 25 into cooperation with the adder 26. The transistors 29 and 31 are rendered conducting to cut off the subject brightness information and the preselected shutter speed from introduction to the adder 26. Responsive to the outputs of the gain control circuit 16 to 20 and the distance setter 24, 25, the adder 26 produces an output voltage which is applied to the exposure meter 28, the position of the deflected pointer being viewed in the field of the camera finder, for example. The resistance values of the fixed resistors 17 and 18 and the variable resistor 24 are so related to one another that the value of the diaphragm aperture is varied with distance at a rate shown in FIG. 2(a).

When the shutter is released, the X sync contactor 49 is closed to discharge the charge on the capacitor 201 (FIG. 9(c)) through the primary of the transformer 200 providing an extremely high voltage on the secondary to trigger the discharge tube 50, and at the same time to gate on the first thyristor 51, whereby the discharge tube 50 is fired. The closure of the X sync contactor 49 also causes start of operation of the flash duration control circuit C with electrical power supplied through the resistor 204 in the trigger circuit 48 at a voltage dependent upon the Zener diode 56.

Since the output voltage of the gain control circuit 19 is proportional to the film speed sensed by the marker contact members 13-2 and 13-4 as ASA 100 and is also applied through an interconnection terminal S5'-and-terminal S5 connection to a non-inversion input of the operational amplifier 57 connected as a voltage follower, the time interval during which the timing capacitor 59 is charged to a threshold level for the switching transistor 61 is determined by the film speed and the intensity of light on the light-receiving surface of the photo-transistor 58. In other words, the higher the film speed is, the higher the output voltage of the gain control circuit is, while the shorter the subject distance, the smaller the resistance of the photo-transistor 58 becomes. At the termination of duration of the time interval, the two transistors 61 and 62 are rendered conducting to produce an actuating signal which is applied to the second thyristor 55, thereby the first thyristor 51 is reverse-biased by the charge on the commutation capacitor 53 to terminate the firing of the tube 50. Thus, the amount of flash light emitted from the tube 50 is controlled in conformance with the flashlight integrated by the integrator circuit 58, 59, the flash rate being adjusted by the gain control circuit to a value shown in FIG. 2(b).

In daylight mode, upon removal of the flash unit from the camera, the switch 16 is automatically closed so that the degree of amplification of the operational amplifier 19 is twice the value occurring when in flash mode. Accordingly, when the film speed is varied twice, the diaphragm aperture is varied one step. The transistor 29 and 31 are in the non-conducting states so that the sensor and shutter speed setter are brought into operative connection with the adder. Because of the change of the output of exclusive OR gate 33 to the high level, the distance setter 24, 25 is no longer effective to cooperate with the adder. In consequence, the diaphragm aperture value is adjusted in accordance with the scene brightness (Bv), preselected shutter speed (Tv) and film speed (Sv) through the diaphragm scanning mechanism 32. If it is desired that the daylight exposure is posible to perform with the flash unit let on the camera, the mode selection switch 16 must be otherwise constructed in a semiconductor form responsive to the attainment of the voltage on storage capacitor 44 to the satisfactory operating level for the flash tube 50.

FIG. 9(b) shows an example of an arrangement of the normally open switch 16 responsive to the attachment and detachment of the flash unit housing 83 to and from the camera at an accessory shoe 80 thereon. An actuator pin 82 for the switch 16 extends through and outwardly beyond a hole provided through the wall of the bottom plate of the shoe 80. When the leg 84 of the flash unit is slidingly inserted into the shoe 80 while depressing a leaf spring 81 in a downward direction, the actuating pin 82 is retracted into the hole by the spring 82, causing the switch 16 to be opened as a resilient movable contact of the switch 16 is moved away from a fixed contact thereof. Upon removal of the flash unit from the camera, the actuator pin 82 follows up the leaf spring 81 under the action of the movable contact of the switch 16, thereby the switch 16 is closed.

Figure 10:
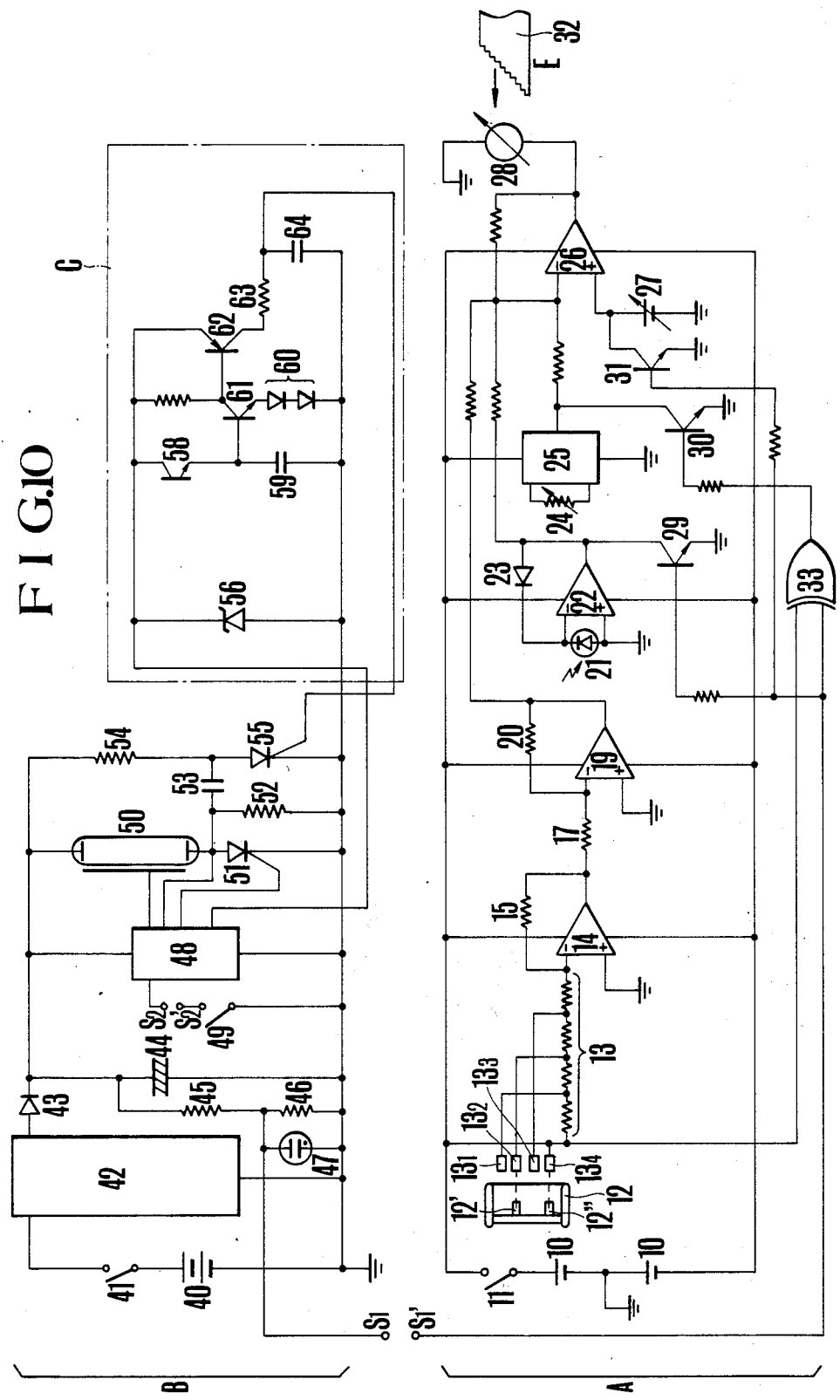
FIGS. 10 to 15 are schematic electrical circuit diagrams of embodiments of exposure control systems for daylight and flash photography according to the present invention adapted to perform the programs of FIGS. 3 to 8 respectively.

FIG. 10 is similar to FIG. 9 with the exception of the omission of the mode selection mechanical switch 16, one of the fixed resistors, resistor 18 in the gain control circuit and the voltage follower connected operational amplifier 57. The circuit shown in FIG. 10 operates in such a manner that when the film speed is varied four times as large, the diaphragm aperture value is varied two steps as shown in FIG. 3(a), while the flash duration is varied as a function only of distance as shown in FIG. 3(b).

Figure 11:
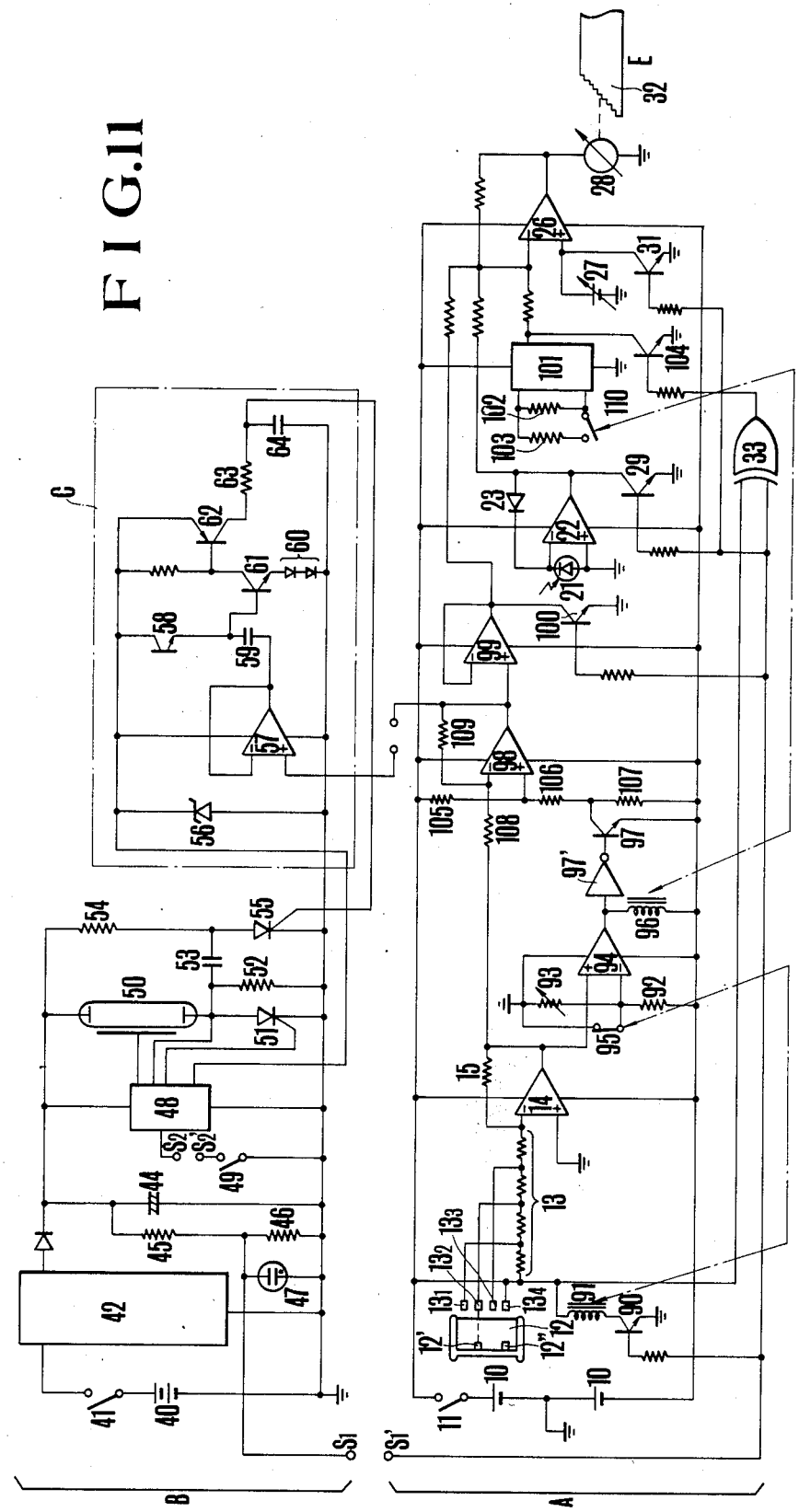

FIG. 11 shows another embodiment of the invention adapted to perform the program of FIG. 4, where the same reference numerals have been employed to denote the similar parts to those shown in FIG. 9. Starting with the operation in flash mode, assume first that the film used has a sensitivity of ASA 100, and the voltage on the storage capacitor 44 is at the satisfactory operating level. Under these conditions, the sensor circuit 21, 22 and 23, the shutter speed responsive voltage source 27 and the film speed setting circuit are cut off from connection with the adder 26 at their respective switching transistors 29, 31 and 100 by the output of the neon tube 47. A distance responsive voltage source of two discrete increments of voltage level is rendered operative with the operational amplifier 26 by the non-conducting of the transistor 104 so that the diaphragm value is discretely varied as a function only of distance.

As the resistor 93 is associated with the distance ring and the distance is increased to 4 meters, the resistance value of a variable resistor 93 is continuously increased with decrease in the voltage appearing at an inversion input of a comparator 94 since a switch 95 across the variable resistor 93 was previously opened by the energized relay 91 through a switching transistor 90. Therefore, the output of the comparator 94 is changed to a high level when the voltage applied at the inversion input exceeds the voltage applied at the non-inversion input dependent upon the film speed, i.e. ASA 100 at the distance of 4 meters. The high level output voltage of the comparator 94 is applied to a second relay coil 96 controlling the closing operation of a switch 110. When the switch 110 is closed, two fixed resistors 102 and 103 are connected in parallel to each other to change the output voltage of the source 101 from the high to the low level at which the diaphragm value is changed from F5.6 to the maximum possible value F2.8 as shown in FIG. 4(a).

At the time when the output of the comparator 94 changes to the high level, the output of an inverter 97' is inverted to render a switching transistor 97 non-conducting so that the output voltage of a gain control circuit including an operational amplifier 98 is shifted to a higher level. Therefore the output voltage of the voltage follower 57 in the circuit C is shifted to a higher level. The resistance values of three resistors 105, 106 and 107 are pre-adjusted so that the total amount of flash light emitted is reduced from f/22 to f/11 when the distance exceeds 4 meters as shown in FIG. 4(b). The resistance values of two resistors 108 and 109 in the gain control circuit are preadjusted so that the total amount of flash light emitted is varied as a function of film speed and distance as shown in FIG. 4(b). The above explanation is made in connection with the case of a film having ASA 100. When a film having other values than ASA 100 is used, the higher the film speed, the lower the output voltage of the operational amplifier 14 becomes to require a higher resistance value of the variable resistor 93 at which the comparator 94 is inverted. Thus, the higher the film speed, the longer the distance is. Therefore, the film sensitivity is increased, the diaphragm value changes to F2.8 from F5.6 and the flash light amount changes to F11 from F22 so that the distance to the subject becomes longer. This distance is a distance when the diaphragm value and the flash light amount are changed sharply.

In daylight mode, because of the lack of the charge completion signal from the flash unit B to the camera A, the transistors 29, 31 and 100 are in the non-conducting state. The transistor 90 also is in the non-conducting state, so that the relay coil 91 remains in the de-energized state with closure of the switch 95. Accordingly, the output of the operational amplifier 94 is at the low level at which the switching transistor 97 is conducting with the resistor 106 grounded.

The two inputs of the exclusive OR gate 33 are different in level from each other, so that the output of gate 33 is at the high level at which the switching transistor 104 is rendered conducting to cut off the distance responsive voltage source 101 from the adder 26. Thus, the daylight exposure diaphragm aperture is automatically adjusted in accordance with the ASA sensitivity signal (Sv), scene brightness signal (Bv) and preselected shutter speed signal (Tv).

Figure 12:
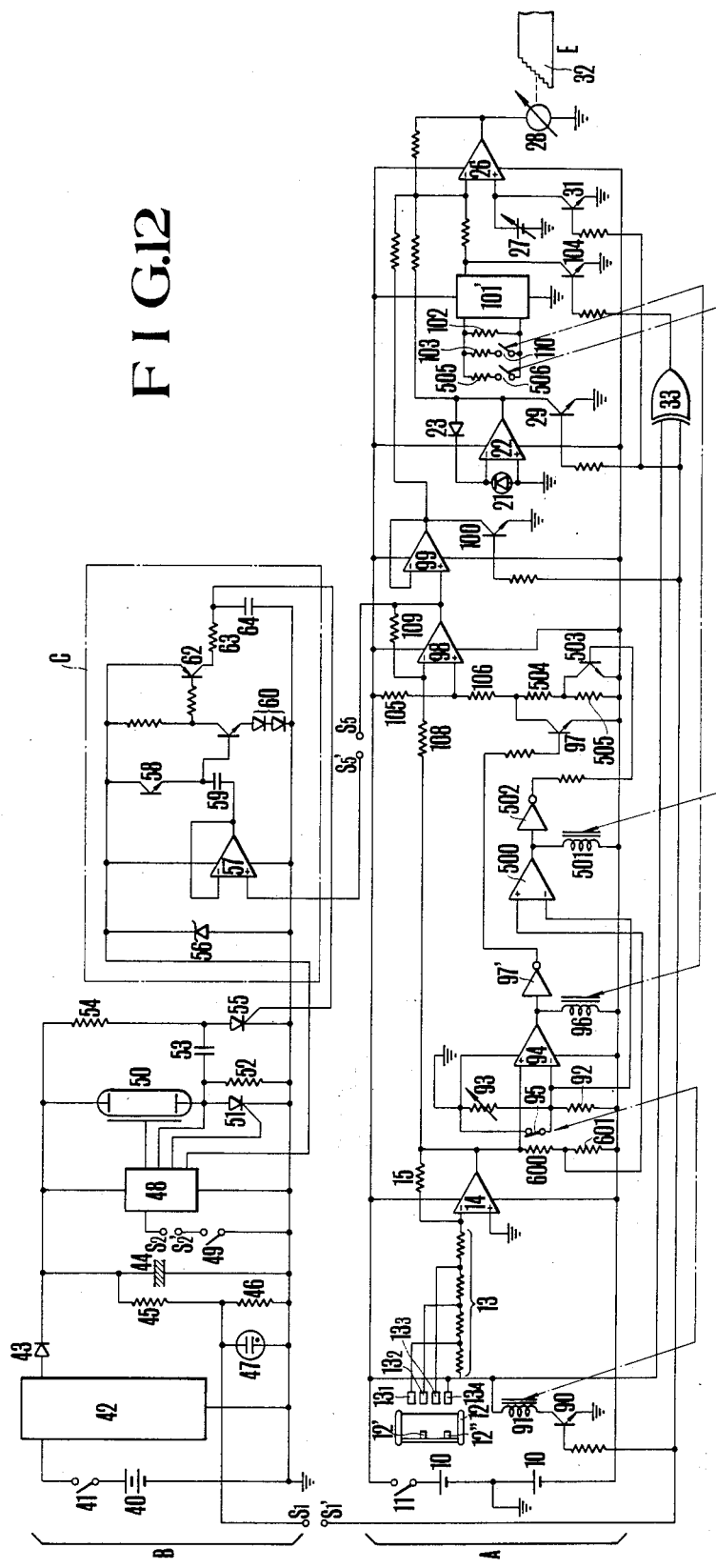

FIG. 12 is similar to FIG. 11 except that two increments of diaphragm value with distance are taken into account and two drops of the amount of flash light emitted occur. There is provided an additional circuit section similar to that including the comparator 94 so that the potential at the non-inversion input of the operational amplifier 98 is varied in three steps at different three distances, while simultaneously varying the output level of the constant voltage source 101 in three steps. The additional circuit section includes an operational amplifier 500 constituting a comparator together with the common resistor 92 of the first comparator and resistors 600 and 601 the last two of which are connected in series to each other and to the output of the operational amplifier 14. The output of the operational amplifier 500 is connected to a relay coil 501 controlling the closing operation of a switch 506. When the switch 506 is closed, an additional fixed resistor 505 is brought into parallel connection with the resistor 102. The output of the operational amplifier 500 is also applied to the base of a switching transistor 503 through an inverter 502 and a resistor. The collector and emitter of the transistor 503 are connected across an additional resistor 505 connected in series to a resistor 504, while the collector and emitter of the switching transistor 97 are connected across the resistors 504 and 505 which correspond to the resistor 109 of FIG. 11.

The operation of the circuit of FIG. 12 will be fully described in connection with the ASA sensitivity of 100. When the main switches 11 and 41 are closed, the storage capacitor 44 is charged a satisfactory level, at which time the neon tube 47 is lit. And the switching transistor 90 is rendered conducting to energize the relay coil 91. The switch 95 opens by the excitation of the relay coil 91. When the relay switch 95 is opened, the distance responsive variable resistor 93 is rendered effective for the two comparators 94 and 500. The exposure meter 28 is made operative only with the output of the distance range responsive voltage source 101'.

When a film of ASA 100 is used, the resistance value of the resistor 93 reaches a predetermined value, if the distance is 2 meters or more, so that the output of the comparator 94 is inverted, while the output of the comparison circuit 500 is not inverted but maintained at a low level. And when the comparator is inverted, the relay 96 is excited. The energized relay 96 closes the switch 110 so that the diaphragm value is shifted from F11 to F5.6 as shown in FIG. 5(a). The high level output of the operational amplifier 94 also causes non-conduction of the transistor 97 which in turn causes the output voltage of the operational amplifier 98 to be shifted to a higher level at which the total amount of flash light emitted is dropped from the maximum possible value of 22 to a value of 11 independent of the film speed, since the resistance values of the resistors 105, 106, 504 and 505 are pre-adjusted to effect such result.

Upon further increase in distance to 4 meters, the output voltage of the operational amplifier 500 is changed to a high level at which the relay coil 501 is energized to close the switch 505, causing the diaphragm aperture to change from F5.6 to the maximum possible value of F2.8, since the resistance values of the resistors 600 and 601 are pre-adjusted to effect such result, as shown by the solid line labelled A100 in FIG. 5(a). The change of the output voltage of the operational amplifier 500 to the high level also causes nonconduction of the switching transistor 503 which causes an increase in the output voltage of the operational amplifier 98 by a magnitude corresponding to the resistance value of the resistor 505. As the voltage follower 57 also shifts its output to a higher level, the total amount of flash light emitted is dropped to f/11 again as shown by the solid lines labelled P100 in FIG. 5(b).

The foregoing description applies to ASA 100 film, and it is valid for other values of film speeds as shown by dot-and-dash lines in FIG. 5. The higher the film For this reason, in case of a short-distnce photography, the stopping time for the flashing is always constant, thus producing a constant amount of flash. In the case of a long-distance photography, as the time constant of the timing circuit formed by the photo-resistor 58 and the condenser 59 increases, the AND gate 406 emits an output on the bases of the distance and ASA to turn on the transistor 61 just as in FIG. 9, so that the amount of flash light is controlled as shown in FIG. 7(b).

For distances between 0.5 and 2.8 meters at ASA 100, the diaphragm value is varied with distance, reaching the maximum value of F2.8, while the duration of the flash is determined to be f/8 step by the timing circuit. For distances between 2.8 and 8 meters, the diaphragm value is fixed at F2.8, while the duration of the flash is varied as a function of distance since it is controlled by the integrator circuit.

Figure 14:
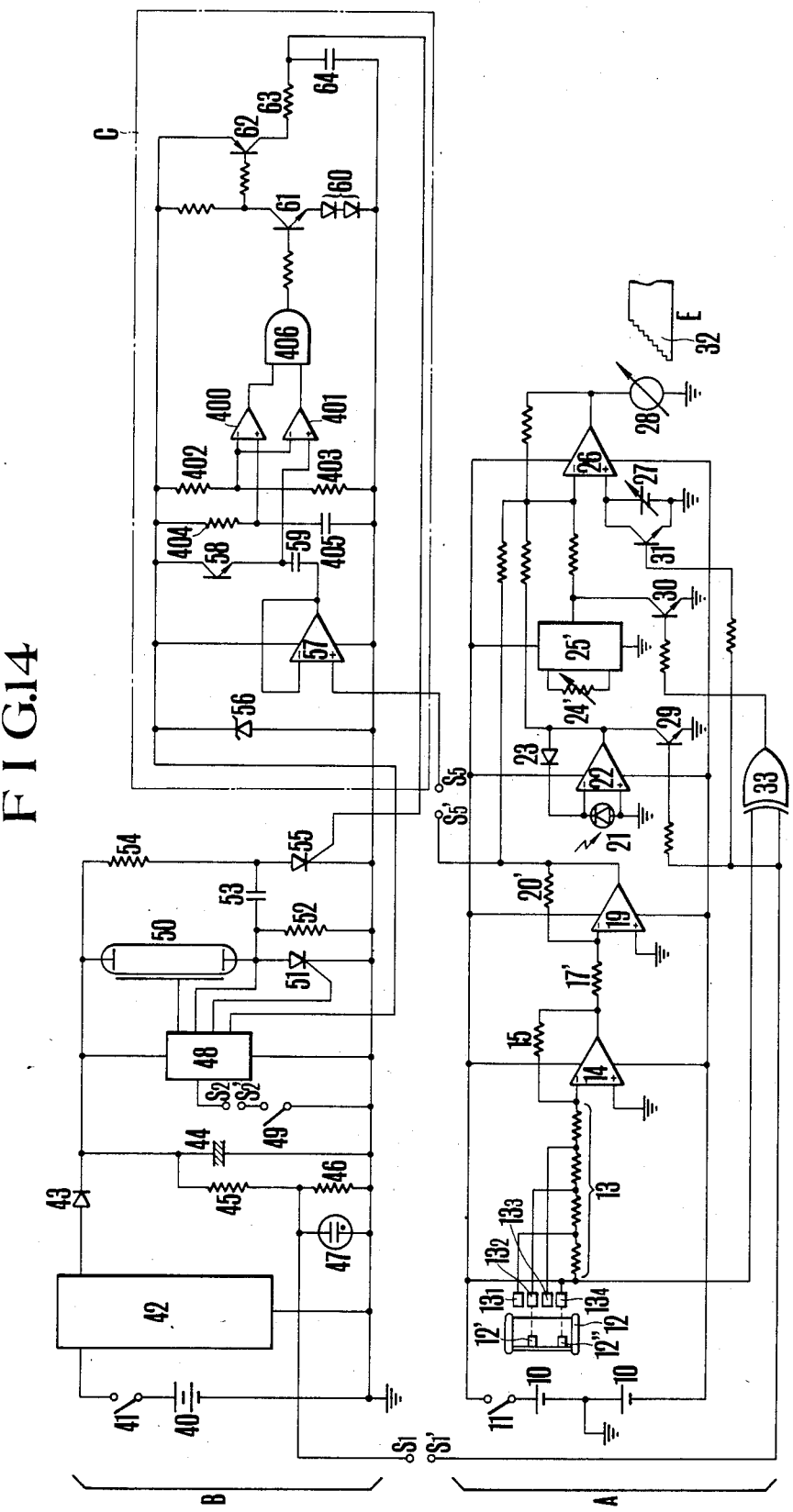
Figure 15:
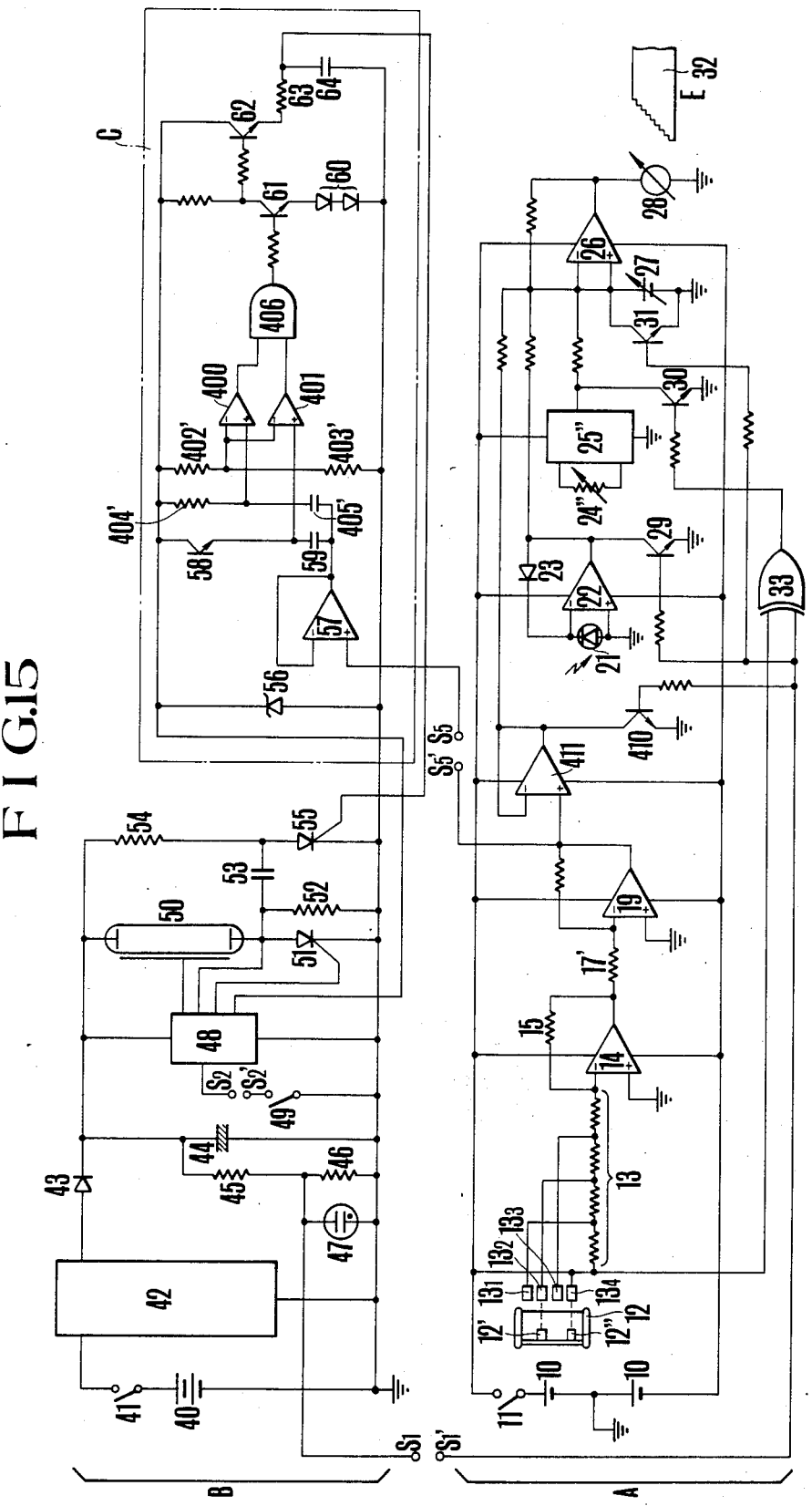

FIG. 15 is similar to FIG. 14 except that when in flash mode the film speed information is cut off from the adder 26 at a switching transistor 410, causing the diaphragm value to vary as a function only of distance where the distance is shorter than 2.8 meters, and tht the timing circuit is connected between the positive bus and the output of the voltage follower connected operational amplifier 57, causing the duration of the flash to vary with film speed even in a range of shorter distances than 2.8 meters but independently of the distance. Whichever time constant of the integrator and timing circuits is larger determines the duration of the flash as in the circuit of FIG. 14. For the distances between 0.5 and 2.8 meters, because the time constant of the integrator circuit is smaller than that of the timing circuit, the output of the integrator circuit first reaches the trigger level and then the output of the timing circuit reaches the trigger level at a time at which the outputs of the comparators 400 and 401 are simultaneously of high level, causing the AND gate 406 to produce an output of high level. Conversely when the distance is longer than 2.8 meters, the duration of the flash is controlled based on the impedance of the photo-transistor 58, and the film speed as shown in FIG. 8(b).

Still another embodiment of the invention adapted to perform the program of FIG. 7 will now be explained in connection with FIG. 16. Although the above-mentioned seven embodiments of FIGS. 9 to 15 employ independent and parallel introductions of the various parameters into each of the diaphragm control means and the flash duration control means, this embodiment of FIG. 16 operates in such a manner that the diaphragm control means is first supplied with necessary exposure parameters to derive a proper diaphragm value based on the predetermined program, and then the proper diaphragm value as a parameter and the other necessary parameters are introduced into the flash duration control means to effect a correct flash exposure.

Figure 16:
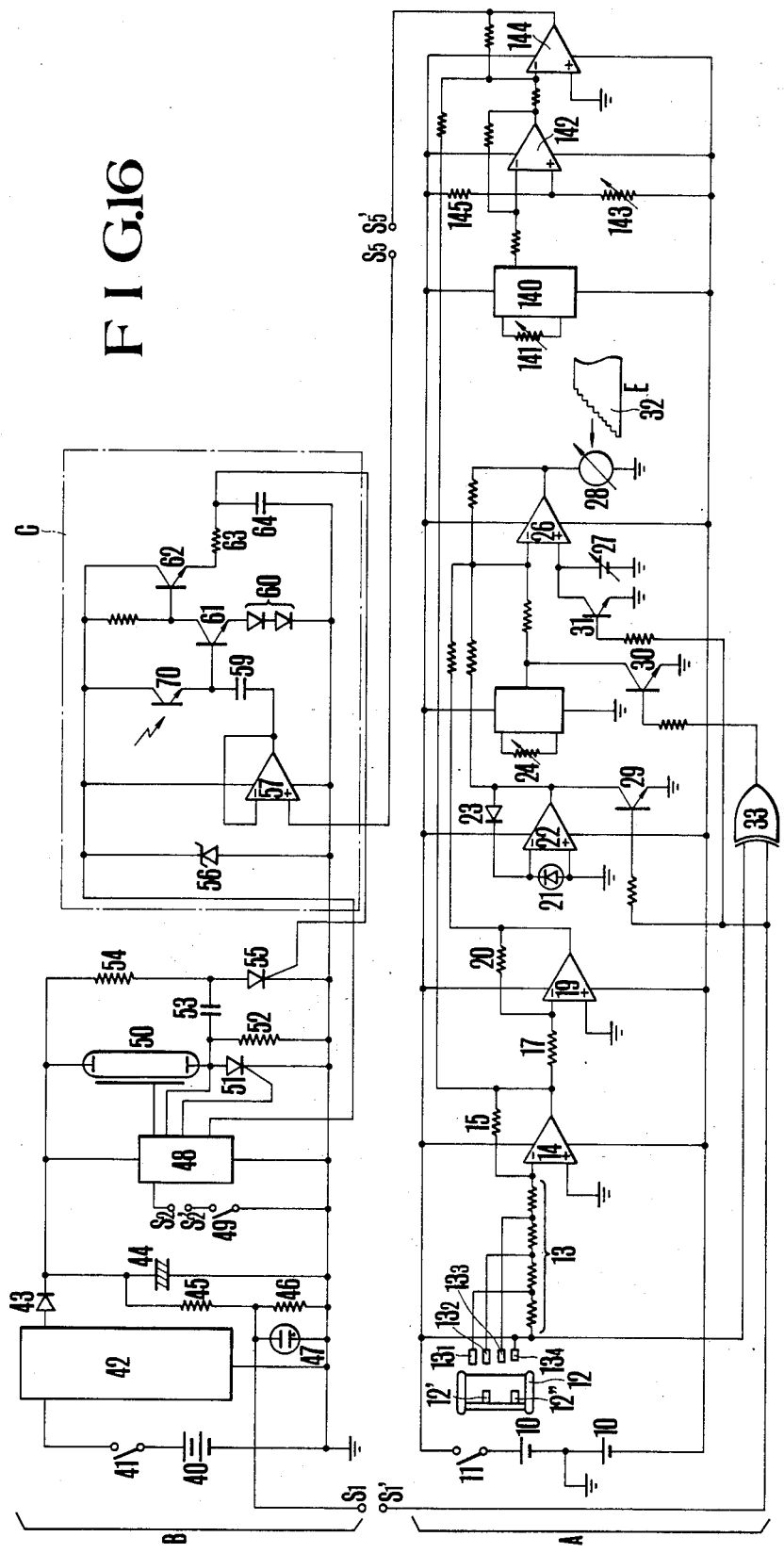
FIG. 16 is a similar view showing an example of modification of the circuit of FIG. 14.

FIG. 16 is similar to FIG. 9(a) except that the mechanical switch 16 is removed, and that there is provided a diaphragm responsive signal generator of which the output is applied to the non-inversion input of the operationsl amplifier 57 of the flash duration control circuit C. A constant voltage source 140 cooperates with a variable resistor 141 having a resistance value related to the difference between the fully open aperture and the proper diaphragm value displayed by the exposure meter 28. This resistor 141 is arranged to cooperate with a diaphragm presetting control lever, not shown, as in any of the interchangeable objective lenses of FD type available from Canon K.K. The larger the difference of diaphragm aperture, the lower the output voltage of the constant voltage source is. The output of the voltage source 140 is applied to an inversion input of an operational amplifier 142 constituting part of an inverting amplifier device. A fixed resistor 145 and a variable resistor 143 having a resistance value related to the fully open F-number are connected to series to each other between the positive and negative buses, and have a junction connected to a non-inversion input of the operational amplifier 142. The output of the operational amplifier 142 represents the absolute value of diaphragm aperture which is combined with film speed information in an adder which includes an operational amplifier 144 to produce an output which is applied through the terminal S5'-and-S5 connection to the flash duration control circuit C.

The resistance values of the fixed resistor 15 and variable resistor 24 are preadjusted so that the diaphragm value is varied as a function of distance and film speed at a rate shown in FIG. 7(a). The thus adjusted diaphragm aperture information is introduced into the variable resistor 141. Then, the output of the diaphragm responsive generator is fed to the flash duration control circuit C so that the amount of flash light emitted is controlled in accordance with the photoelectrically sensed distance and the exposure value, the latter being a function of the film speed, and mechanically sensed distance, to effect a result equivalent to that shown in FIG. 7(b). In other words, for distances shorter than 2.8 meters at ASA 100, for example, the distance information introduced into the photo-transistor 70 is cancelled by the output of the operational amplifier 144 to maintain the total amount of flash light emitted at a constant level of f8. For distances longer than 2.8 meters, the output of the operational amplifier 144 remains fixed at a value corresponding to F2.8, so that the duration of the flash is controlled in accordance with the photoelectrically sensed distance only for the fixed film speed.

An advantage of FIG. 16 embodiment over the foregoing embodiments is that, since the flash illumination is controlled in accordance with the actually stopped down diaphragm value, an accidental deviation of the actual diaphragm value from the computed value does not lead to the production of an incorrect flash exposure.

Still another advantage is that the design flexibility of the programs is greatly increased. For example, though all the programs are defined by straight lines, elaborate curves may be employed to improve the accuracy and reliability of flash exposure control.

It will be seen from the foregoing description that the described embodiments of the invention accomplish the above-mentioned objects by taking into account the camera-to-subject distance and the film speed in deriving flash exposure values, though the conventional system allows for adjustment of only one of the diaphragm value and flash illumination in accordance with the distance and does not suitably deal with the film speed.

The invention has been described in detail with particular reference to preferred embodiments thereof, but it will be understood that variations and modifications can be effected within the spirit and scope of the invention. For example, instead of making the flash device separable from the camera, the flash device may be incorporated in the camera housing.

What is claimed is:

speed, the lower the output voltage of the operational amplifier 14 becomes, and therefore the resistance value of the variable resistor 93 necessary for inverting increases, so that the distance at which the diaphragm value and the amount of flash light are changed over, becomes longer. According, the diaphragm value is changed from F11 to F5.6 at a distance of 1 meter or 4 meters for ASA 25 or ASA 400 respectively, and from F5.6 to F2.8 at a distance of 2 or 8 meters.

In daylight mode, the lack of the charge completion signal cuts off the switching transistors 29, 31 and 100 and the switching transistor 90. Since the switch 95 remains closed, the output voltages of the comparators 94 and 500 are at the low level and therefore the switching transistors 97 and 503 are in the conducting state so that the resistor 106 is grounded. The two inputs of the exclusive OR gate 33 are different from each other to cut off the distance responsive voltage source 101' from connection with the adder at the switching transistor 104. The resultant circuit controls the diaphragm aperture in accordance with the film speed (Sv), scene brightness (Bv) and preselected shutter speed (Tv) likewise as in FIG. 9.

Figure 13:
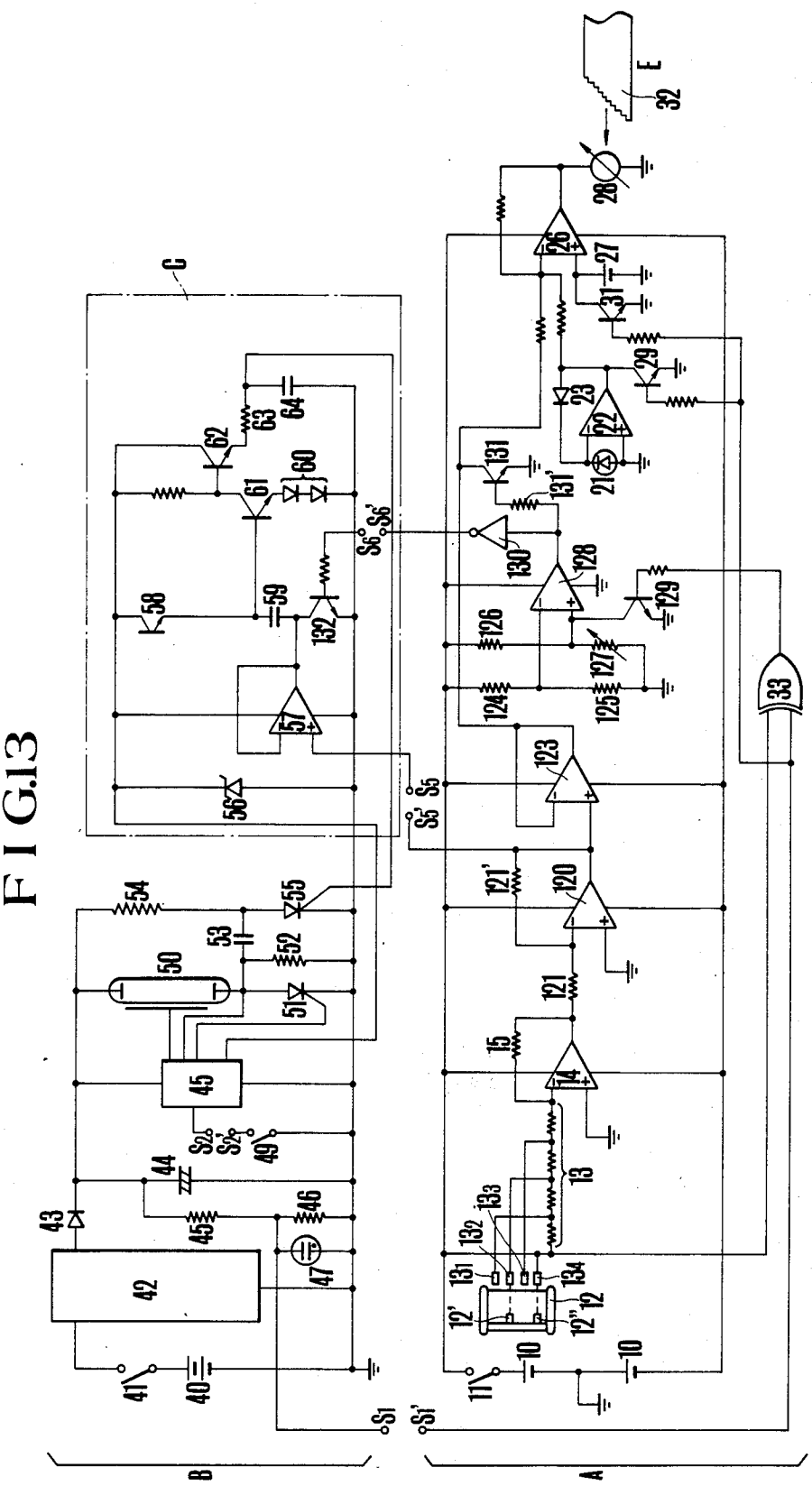

FIG. 13 shows another embodiment of the invention adapted to perform the fifth program of FIG. 6. As the distance is decreased to reach 4 meters, the diaphragm aperture is changed from the maximum possible value of F2.8 to a value of F5.6 or F11 for the film speed of ASA 100 or ASA 400 respectively which is maintained unchanged in a distance range of from 4 to 0.5 meters, while the duration of the flash is continuously varied or decreased as a function only of distance in that distance range. For this purpose, there is provided a circuit section including a gain control circuit comprised of an operational amplifier 120 and resistors 121 and 121'. The output of the gain control circuit is connected both to the interconnection terminal S5' and to an amplifier 123 constituting a voltage follwer. The output of the amplifier 123 is connected to the adder 26. The circuit section further includes an operational amplifier 128 constituting a comparator together with resistors 124 to 127. The operational amplifier 128 has an inversion input connected to a junction of the resistors 124 and 125 which constitute a voltage divider, and has a non-inversion input connected to a junction of the resistors 126 and 127. The resistor 127 is a variable resistor cooperative with a distance adjusting ring, not shown, on the camera objective mount, and having a larger resistance value at a longer distance. The resistance values of these four resistors 124 to 127 are pre-adjusted so that when the distance is increased to exceed 4 meters, the output voltage of the operational amplifier 128 changes from a low to a high level. The output voltage of the comparator 128 is applied to the base of a transistor 131 through a base resistor 131'. The collector of the transistor 131 is connected to the output of the voltage follwer 123, and the emitter is grounded. The resistance value of the base resistor 131' is pre-adjusted so that when the transistor 131 is rendered conducting, the collector voltage is made equal to the one of the output voltages of the operational amplifier 123 which occurs when ASA 25 is used. the output of the comparator 128 is also directed through an inverter 130 to an interconnection terminal S6' on the camera housing and therefrom further to an interconnection terminal S6 on the unit housing which is connected through a resistor to the base of a switching transistor 132. The transistor 132 has a collector connected to the output of the amplifier 57 consisting of a voltage follower and has an emitter connected to the circuit ground.

The operation of the circuit of FIG. 13 is as follows. After the main switches 11 and 41 are closed, the attainment of the voltage on the capacitor 44 to the aforesaid level causes the sensor and shutter speed setter to be cut off from connection with the adder 26. The two inputs of the exclusive OR gate 33 are at a high level so that a switching transistor 129 is in the non-conducting state where the output of the comparator 128 is changeable at the distance of 4 meters.

For the distances shorter than 4 meters, the comparator 128 produces an output voltage of low level at which the transistor 131 is non-conducting, causing the diaphragm value to be varied as a function only of film speed as shown in FIG. 6(a) the comparator output voltage is applied through the inverter 130 to the transistor 132, causing the duration of the flash to be varied as a function only of distance as shown in FIG. 6(b).

For the distances between 4 and 8 meters at ASA 100, or between 4 and 16 meters at ASA 400, the comparator 128 produces an output voltage of high level at which the transistor 131 is conducting to set the diaphragm value at F2.8 independent of the film speed and distance, and the transistor 132 is non-conducting, causing the duration of the flash to increase from f/11 step at ASA 100 or from f/5.6 step at ASA 400 as the distance is increased from 4 meters as shown in FIGS. 6(a) and 6(b).

FIG. 14 shows another embodiment of the invention adapted to perform the sixth program of FIG. 7, and different from FIG. 9 embodiment in that the construction of the distance responsive voltage source 25 is modified to produce a variable voltage capable of reaching a maximum value at a distance after which the maximum value is maintained despite increases in distance, and that the flash duration control circuit C is provided with a timing circuit comprising a resistor 404 and a capacitor 405 connected in series to each other between the positive and negative buses. Whichever output voltage of the integrator circuit and timing circuit reaches a trigger value for each of comparators 400 and 401 last will terminate the duration of the flash. For this purpose, the non-inversion inputs of the comparators 400 and 401 are connected to the respective outputs of the integrator and timing circuits, and the inversion inputs are connected to a common junction of resistor 402 and 403. The outputs of the comparators 400 and 401 are connected to respective inputs of an AND gate 406 having an output connected through a resistor to the base of the transistor 61.

In case of a flash photography, the diaphragm value is regulated by ASA and the distance, and it maintains a constant level after it has reached a predetermined value so that it is possible to control the diaphragm value by the properties shown in FIG. 7(a). The amount of flash light is regulated by the output of either the timing circuit formed by the phototransistor 58 and the condenser 59 or the timing circuit formed by the resistor 404 and the condenser 405, which has a larger time constant.

Therefore, in case of a short-distance photography, the amount of flash light is controlled by the output of the timing circuit formed by the resistor 404 and the condenser 405, and when the output reaches a level determined by the resistors 402 and 403 a high level signal is output from the AND gate 406 to turn on the transistor 61, thus stopping the flashing.

1. A flash photographic exposure system comprising:
(A) a camera including:
  (1) a diaphragm control circuit for controlling an aperture, said control circuit adjusting the aperture at a value corresponding to a film sensitivity in a first object distance range and setting the aperture irrespective of the film sensitivity in a second object distance range longer than the first object distance range so as to perform flash photography;
(B) a flash device including:
  (1) flash means for generating a flash;
  (2) light receiving means for receiving light from the flash reflected from the object;
  (3) a flash light amount control circuit connected to said light receiving means, said circuit stopping the generation of flash when the amount of reflected light received by the light receiving means reaches a predetermined light amount level; and
  (4) adjusting means for adjusting the light amount level, said means adjusting the light amount level irrespective of the film sensitivity in the first object distance range, and adjusting the light amount level in correspondence to the film sensitivity in the second object distance.

2. A flash photographic exposure system comprising:
(A) a camera including:
  (1) an aperture control circuit for controlling an aperture, said circuit adjusting the aperture at a value corresponding to a film sensitivity in a first object distance range and setting the aperture irrespective of the film sensitivity in a second object distance range longer than the first object distance range so as to perform flash photography;
(B) a flash device including:
  (1) flash means for generating a flash; and
  (2) a flash light control circuit for controlling an amount of flash light, said circuit having a first function of adjusting the flash light amount in correspondence to the amount of received flash light reflected from an object, and a second function of adjusting the flash light amount irrespective of the amount of the received flash light, and adjusting the flash light amount by the second function in the first object distance range and adjusting it by the first function in the second distance range.

3. A system according to claim 2, in which the flash light amount control circuit adjusts the flash light amount on the basis of film sensitivity.

4. A flash photographic exposure system comprising:
(A) a camera including:
  (1) an aperture control circuit for controlling an aperture, said circuit adjusting the aperture in correspondence to an object distance and a film sensitivity in the case of a short object distance and adjusting the aperture irrespective of the object distance and the film sensitivity in the case of a long object distance so as to perform flash photography;
(B) a flash device including:
  (1) flash means for generating a flash; and
  (2) a flash light amount control circuit for controlling an amount of flash light, said circuit having a first function of adjusting the flash light amount in correspondence to the amount of received light reflected from an object, and a second function of adjusting the flash light amount irrespective of the amount of the received flash light, and adjusting the flash light amount by the second function in the short object distance range and adjusting it by the first function in the long distance range.

5. A system according to claim 4, in which the adjusting means adjusts the light amount level in correspondence to film sensitivity.

6. A system according to claim 4, in which the value of the first object distance range is adjusted in correspondence to the film sensitivity.

7. A flash device comprising:
(a) flash means for generating a flash;
(b) light receiving means for receiving light from the flash reflected from the object;
(c) a flash light amount control circuit connected to said light receiving means, said circuit stopping the generation of flash when the amount of reflected light received by the light receiving means reaches a predetermined light amount level; and
(d) adjusting means for adjusting the light amount level, said adjusting means adjusting the light amount level irrespective of the film sensitivity when the object distance is within a first object distance range, and adjusting the light amount level in correspondence to the film sensitivity when the object distance is within a second object distance range.

8. A camera comprising:
(a) an aperture control circuit for controlling an aperture; and
(b) control means operable in flash photography, said means controlling the control circuit so as to obtain an aperture value corresponding to film sensitivity when an object distance is within a first object distance range, and controlling the control circuit irrespective of the film sensitivity to obtain a predetermined aperture value when the object distance is within a second object distance range.

9. A flash device comprising:
(a) flash means for generating a flash;
(b) a flash light amount control circuit for controlling the amount of flash light, said circuit having a first function of adjusting the amount of flash in correspondence to an amount of flash light reflected from an object, and a second function of adjusting the amount of flash to a predetermined constant amount irrespective of the amount of flash light reflected from the object, and adjusting the amount of flash by the second function when an object distance is within a first object distance range and adjusting the amount of flash by the first function when the object distance is within the second object distance range.

10. A flash device comprising:
(a) flash means for generating a flash; and
(b) a flash light amount control circuit for controlling an amount of flash light, said circuit having a first function of adjusting the amount of flash light in correspondence to the amount of received flash light reflected from an object, and a second function of adjusting the amount of flash light irrespective of the amount of the received flash light, and adjusting the amount of flash light by the second function in the first object distance range and adjusting it by the first function in the second distance range.

11. A flash photographic system with camera and flash device comprising:
   (a) a diaphragm control circuit for controlling an aperture, said control circuit adjusting the aperture at a value corresponding to a film sensitivity in a first object distance range and setting the aperture irrespective of the film sensitivity in a second object distance range;
   (b) flash means for generating a flash;
   (c) light receiving means for receiving light from the flash reflected from the object;
   (d) a flash light amount control circuit connected to said light receiving means, said circuit stopping the generation of flash when the amount of reflected light received by the light receiving means reaches a predetermined light amount level; and
   (e) adjusting means for adjusting the light amount level, said means adjusting to the light amount level irrespective of the film sensitivity in the first object distance range, and adjusting the light amount level in correspondence to the film sensitivity in the second object distance range.

12. A flash device comprising:
   (a) flash means for generating a flash;
   (b) a flash light amount control circuit for controlling the flash light amount, said circuit stopping the generation of flash when the amount of reflected flash light from the object reaches a predetermined light amount level; and
   (c) adjusting means for adjusting the light amount level, said adjusting means adjusting the light amount level irrespective of the film sensitivity when an object distance is within a first object distance range and adjusting the light amount level in correspondence to the film sensitivity when the object distance is within a second object distance range.

13. A flash photographic system comprising:
   (A) a camera including:
      (1) an aperture control circuit for controlling an aperture, said circuit adjusting the aperture at a value corresponding to an object distance in a first object distance range and adjusting the aperture at a certain predetermined value irrespective of object distance in a second object distance range; and
   (B) a flash device including:
      (1) flash means for generating a flash; and
      (2) a flash light control circuit for controlling an amount of flash light, said circuit having a first function of adjusting the flash light amount in correspondence to the amount of received flash light reflected from an object, and a second function of adjusting the flash light amount irrespective of the amount of the received flash light, and adjusting the flash light amount by the second function in the first object distance range and adjusting it by the first function in the second distance range.

14. A flash photographic system with camera and flash device comprising:
   (a) an aperture control circuit for controlling an aperture, said circuit adjusting the aperture at a value corresponding to an object distance in a first object distance range and adjusting the aperture at a certain predetermined value irrespective of object distance in a second object distance range;
   (b) flash means for generating a flash; and
   (c) a flash light control circuit for controlling an amount of flash light, said circuit having a first function of adjusting the flash amount in correspondence to the amount of received flash light reflected from an object, and a second function of adjusting the flash light amount irrespective of the amount of the received flash light, and adjusting the flash light amount by the second function in the first object distance range and adjusting it by the first function in the second distance range.

15. A flash photographic system with a flash device and camera comprising:
   (a) flash means for generating a flash;
   (b) light receiving means for receiving light from the flash reflected from the object; and
   (c) a flash light amount control circuit for terminating the generation of flash by said flash means when the amount of light received by said light receiving means reaches a predetermined amount level; and
   (d) a diaphragm control circuit for controlling a diaphragm in accordance with a diaphragm signal, said flash photographic system further comprising:
   (e) object distance information means for forming a distance information representing an object distance;
   (f) a diaphragm signal forming circuit for producing the diaphragm signal to be applied to the diaphragm control circuit, said diaphragm signal forming circuit having a plurality of diaphragm signal means including first diaphragm signal means and second diaphragm signal means;
   (g) selecting means for selecting the signal means on the basis of said distance information to select the first signal means when the distance information represents an object distance in a first object distance range and to select the second signal means when the distance information represents an object distance in a second object distance range which is different from said first object distance range, whereby said diaphragm signal forming circuit forms a diaphragm signal representing a first diaphragm value on the basis of said first signal means when the object distance is within the first object distance range while said diaphragm signal forming circuit forms a diaphragm signal representing a second diaphragm value on the basis of said second signal means when the object distance is within the second object distance range, so that the diaphragm is changed in a stepwise manner depending upon whether the object distance is within the first object distance range or within the second object distance range; and
   (h) adjusting means for adjusting the light amount level, said means setting the light amount level of said flash light amount control circuit at a first light amount level when the object distance is within the first object distance range and setting the light amount level of said flash light amount control circuit at a second light amount level when the object distance is within the second object distance range.

16. A flash photographic system with a flash device and camera comprising:
   (a) flash means for generating a flash;

(b) light receiving means for receiving light from the flash reflected from the object; and (c) a flash light amount control circuit for terminating the generation of flash by said flash means when the amount of light received by said light receiving means reaches a predetermined light amount level; and (d) a diaphragm control circuit for controlling a diaphragm in accordance with a diaphragm signal, said flash photographic system further comprising:

(e) object distance range information means, said means detecting the object distance range where the object is located, said information means being designed to divide the object distance into a plurality of object distance ranges each having a predetermined object width so as to detect in which range the object is located;

(f) diaphragm signal forming means producing the diaphragm signal to be applied to the diaphragm control circuit, said signal forming means producing a plurality of the diaphragm signals, each of the diaphragm signals having different values;

(g) selecting means for selecting a predetermined diaphragm signal in accordance with the detected distance range where the object is located, by object distance range, said diaphragm signal forming means forming a predetermined diaphragm signal in accordance with the detected distance range, so that the diaphragm is varied in a stepwise manner in correspondence to each of the distance ranges of predetermined widths; and (h) light amount level adjusting means for adjusting said light amount level of said flash light amount control circuit, said means setting at said amount control circuit a light amount level which has a different value in compliance with the object distance range where the object is located.

17. A flash photographic system according to claim 16, in which the light amount level adjusting means includes a plurality of light amount level sources having different values and selecting means for selecting one of said light amount level sources, and said selecting means selecting a predetermined light amount level source in accordance with the object distance range where the object is located, whereby the light amount level is set in compliance with the value of the selected light amount level source.

18. A flash device to be used with a camera having a diaphragm control circuit which controls a diaphragm on the basis of a diaphragm signal, comprising:

(a) flash means for generating a flash;

(b) a flash light amount control circuit connected to a light receiving means, said control circuit controlling a time point for termination of flash generation by the flash means on the basis of an amount of light received by the light receiving means; and (c) adjusting means having setting means coupled to object distance information means which detects in which of a plurality of distance ranges, each having a predetermined width, the object is located, and form diaphragm signals having different values corresponding to the ranges where the object is located so as to change the diaphragm in a stepwise manner corresponding to the range in which the object is located, said setting means setting an information corresponding to the range in which the object is located and adjusting a time point for termination of flash generation by the flash light amount control circuit in accordance with the set information.

19. A flash photographic system with a flash device and camera comprising:

(a) flash means for generating a flash;

(b) light receiving means for receiving light from the flash reflected from the object;

(c) a flash light amount control circuit for controlling a time point for termination of flash generation on the basis of an amount of light received by the light receiving means; and (d) a diaphragm control circuit for controlling a diaphragm in accordance with a diaphragm signal, said flash photographic system further comprising:

(e) object distance sensing means for detecting the object distance;

(f) diaphragm signal forming means for forming diaphragm signals of different values each determined in accordance with each of the distance ranges, each having a predetermined width, depending on the range to which the detected object distance belongs, whereby the diaphragm is varied in a stepwise manner in correspondence to each of the distance ranges of predetermined widths; and (g) adjusting means for setting an adjusted information of different values for each of the ranges in response to the stepwise change of the diaphram so as to adjust the time point for termination of flash generation controlled by the flash light amount control circuit on the basis of the adjusted information set for each of the ranges.

* * * * *